(12) United States Patent
Koretskiy

(10) Patent No.: US 10,902,740 B2
(45) Date of Patent: Jan. 26, 2021

(54) GRAMMAR ORGANIZER

(71) Applicant: Nikolay Vassilievich Koretskiy, Pyatigorsk (RU)

(72) Inventor: Nikolay Vassilievich Koretskiy, Pyatigorsk (RU)

(*) Notice: Subject to any disclaimer, the term of this patent is extended or adjusted under 35 U.S.C. 154(b) by 0 days.

(21) Appl. No.: 15/642,178

(22) Filed: Jul. 5, 2017

(65) Prior Publication Data

US 2020/0135040 A1    Apr. 30, 2020

Related U.S. Application Data

(60) Provisional application No. 62/358,606, filed on Jul. 6, 2016.

(51) Int. Cl.

| | | |
|---|---|---|
| *G09B 7/08* | (2006.01) | |
| *G06T 19/20* | (2011.01) | |
| *G06F 3/16* | (2006.01) | |
| *G10L 15/193* | (2013.01) | |
| *A63F 9/04* | (2006.01) | |
| *G09B 19/06* | (2006.01) | |
| *A63F 1/04* | (2006.01) | |

(52) U.S. Cl.
CPC ............... *G09B 7/08* (2013.01); *G06F 3/167* (2013.01); *G06T 19/20* (2013.01); *A63F 9/0413* (2013.01); *A63F 2001/0475* (2013.01); *G09B 19/06* (2013.01); *G10L 15/193* (2013.01)

(58) Field of Classification Search
CPC ............... A63F 3/0423; A63F 9/0413; A63F 2001/0475; G09B 19/06; G09B 7/08; G10L 15/193; G06T 19/20; G06T 3/167; G06F 3/167
See application file for complete search history.

(56) References Cited

U.S. PATENT DOCUMENTS

| | | | | |
|---|---|---|---|---|
| 3,728,800 A | * | 4/1973 | Magram ................. | G09B 1/36 434/171 |
| 4,044,476 A | * | 8/1977 | Marsh ................... | A63F 9/0001 434/171 |
| 4,419,080 A | * | 12/1983 | Erwin .................... | G09B 19/08 283/46 |
| 4,470,821 A | * | 9/1984 | LeCapelain ........... | G09B 19/08 273/272 |
| 4,478,582 A | * | 10/1984 | Tucker .................. | G09B 19/08 434/170 |
| 4,613,309 A | * | 9/1986 | McCloskey ........... | G09B 19/06 434/170 |
| 5,013,245 A | * | 5/1991 | Benedict ............... | G09B 1/10 434/113 |
| 5,429,371 A | * | 7/1995 | Bledsoe ................ | A63F 3/0423 273/243 |

(Continued)

*Primary Examiner* — Jack Yip

(57) ABSTRACT

A teaching and learning aid for articulation of a verb-related language grammar. A number of grammar tables are gathered in structured assemblies. Each assembly describes different verb-related grammar category. A solid body unifies all assemblies into one system by providing one face to each assembly. Each face of a solid body has its assigned color to code its verb-related grammar category. Combination of sides of a solid body visualizes grammar of related colored parts in a sentence. A result is an intuitive and easy-to-use system for teaching, learning, presentation, navigation and analysis of a verb-related grammar.

6 Claims, 26 Drawing Sheets

(56) References Cited

U.S. PATENT DOCUMENTS

Figure 42:
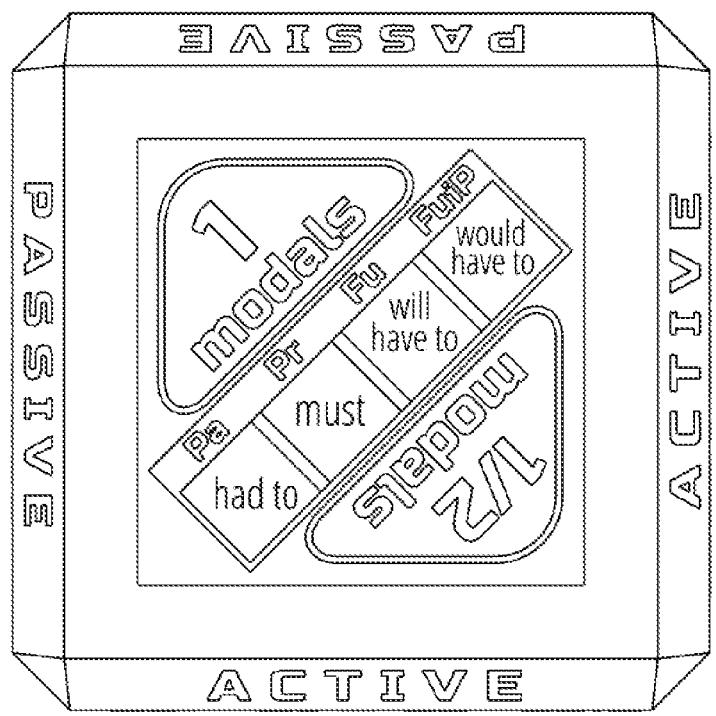

| | | | | |
|---|---|---|---|---|
| 6,659,774 B1* | 12/2003 | Ramos | ............... | G09B 1/02 |
| | | | | 273/146 |
| 7,238,107 B2* | 7/2007 | McVay, III | ............ | A63F 9/0098 |
| | | | | 463/7 |
| 2001/0001631 A1* | 5/2001 | Platts | ............... | B43K 8/003 |
| | | | | 401/88 |
| 2003/0031987 A1* | 2/2003 | Gore | ............... | G09B 21/009 |
| | | | | 434/156 |
| 2005/0069845 A1* | 3/2005 | Spaventa | ............ | G09B 19/06 |
| | | | | 434/156 |
| 2007/0269773 A1* | 11/2007 | Slade | ............... | G09B 19/00 |
| | | | | 434/98 |
| 2008/0233546 A1* | 9/2008 | Baker | ............... | G09B 5/06 |
| | | | | 434/169 |
| 2010/0001469 A1* | 1/2010 | Hubbard | ............ | A63F 1/00 |
| | | | | 273/299 |
| 2010/0230897 A1* | 9/2010 | Stott | ............... | A63F 9/0865 |
| | | | | 273/153 S |
| 2012/0015333 A1* | 1/2012 | Self | ............... | G09B 19/00 |
| | | | | 434/167 |
| 2012/0098199 A1* | 4/2012 | Scriven | ............ | A63F 1/00 |
| | | | | 273/299 |
| 2012/0115112 A1* | 5/2012 | Purushotma | ......... | G09B 5/06 |
| | | | | 434/157 |
| 2016/0129338 A1* | 5/2016 | Almutawa | ......... | A63F 3/0052 |
| | | | | 273/243 |
| 2018/0008882 A1* | 1/2018 | Mehta | ............... | A63F 1/02 |

* cited by examiner

Fig. 1

Verb tense chart based on Azar

| Simple Present<br>*I study every day* | Present Continuous<br>*I am studying right now* | Present Perfect<br>*I have studied Chapter 2* | Present Perfect Continuous<br>*I have been studying for 2 hours* |
|---|---|---|---|
| Simple Past<br>*I studied last night* | Past Continuous<br>*I was studying when you called* | Past Perfect<br>*I had studied chemistry before I began to study maths* | Past Perfect Continuous<br>*I had been studying for 2 hours when they came* |
| Simple Future<br>*I will study tomorrow* | Future Continuous<br>*I will be studying when you arrive* | Future Perfect<br>*I will have finished by the time you arrive* | Future Perfect Continuous<br>*I will have been studying for 2 hours by the time you arrive* |

Chart adapted from Betty S.Azar Understanding and Using English Grammar, Prentice Hall, Inc. Englewood Cliffs, NJ, 1981, pages 74-77

Fig. 2

ACTIVE — 252

| | | PAST | | PRESENT | | FUTURE | | FUTURE-IN-THE-PAST | |
|---|---|---|---|---|---|---|---|---|---|
| INDEFINITE | | R<br>did<br>V-ed<br>worked | I<br>did<br>V-2<br>went | do<br>does<br>V / Vs<br>*He goes home* | | will<br>will+V<br>*I will go home* | | would<br>would+V<br>*I would go home* | |
| CONTINUOUS | | was / were<br>+V-ing<br>*He was reading there* | | am / is / are<br>+V-ing<br>*I am reading now* | | will be<br>+V-ing<br>*I will be reading at that time* | | would be<br>+V-ing<br>*I would be reading at that time* | |
| PERFECT | | R<br>had<br>+ V-ed<br>*I had finished this job* | I<br>had<br>+ V-3<br>*I had done this job* | R<br>have /<br>has<br>+ V-ed<br>*I have finished this job* | I<br>have /<br>has<br>+ V-3<br>*I have done this job* | R<br>will<br>have<br>+ V-ed<br>*I will have finished this job* | I<br>will<br>have<br>+ V-3<br>*I will have done this job* | R<br>would<br>have<br>+ V-ed<br>*I would have finished this job* | I<br>would<br>have<br>+ V-3<br>*I would have done this job* |
| PERFECT CONTINUOUS | | had been<br>+V-ing<br>*I had been reading* | | have / has<br>been +V-ing<br>*I have been reading* | | will have<br>been +V-ing<br>*I will have been reading* | | would have<br>been +V-ing<br>*I would have been reading* | |

Fig. 3

| | PASSIVE | | | | | | | |
|---|---|---|---|---|---|---|---|---|
| | PAST | | PRESENT | | FUTURE | | FUTURE-IN-THE-PAST | |
| | R | I | R | I | R | I | R | I |
| INDEFINITE | was/were + V-ed | was/were + V-3 | am/is are + V-ed | am/is are + V-3 | to will be + V-ed | to will be + V-3 | to would be + V-ed | to would be + V-3 |
| | *I was asked about it* | *I was told about it* | *I am asked about it* | *I am told about it* | *I will be asked about it* | *I will be told about it* | *I would be asked about it* | *I would be told about it* |
| | R | I | R | I | | | | |
| CONTINUOUS | was/were being + V-ed | was/were being + V-3 | am/is are being + V-ed | am/is are being + V-3 | | | | |
| | *I was being asked about it* | *I was being told about it* | *I am being asked about it* | *I am being told about it* | | | | |
| | R | I | R | I | R | I | R | I |
| PERFECT | had been + V-ed | had been + V-3 | have been + V-ed | have been + V-3 | will have been + V-ed | will have been + V-3 | would have been + V-ed | would have been + V-3 |
| | *I had been asked about it* | *I had been told about it* | *I have been asked about it* | *I have been told about it* | *I will have been asked about it* | *I will have been told about it* | *I would have been asked about it* | *I would have been told about it* |
| PERFECT CONTINUOUS | | | | | | | | |

Fig. 4

| | | INFINITIVES *active* |
|---|---|---|
| INDEFINITE | 0+ | write |
| | 0- | not write |
| | 1+ | to write |
| | 1- | not to write |
| CONTINUOUS | 0+ | be writing |
| | 0- | not be writing |
| | 1+ | to be writing |
| | 1- | not to be writing |
| PERFECT | 0+ | have written |
| | 0- | not have written |
| | 1+ | to have written |
| | 1- | not to have written |
| PERFECT CONTINUOUS | 0+ | have been writing |
| | 0- | not have been writing |
| | 1+ | to have been writing |
| | 1- | not to have been writing |

Fig. 5

| | | INFINITIVES *passive* |
|---|---|---|
| INDEFINITE | 0+ | be written |
| | 0− | not be written |
| | 1+ | to be written |
| | 1− | not to be written |
| CONTINUOUS | 0+ | be being written |
| | 0− | not be being written |
| | 1+ | to be being written |
| | 1− | not to be being written |
| PERFECT | 0+ | have been written |
| | 0− | not have been written |
| | 1+ | to have been written |
| | 1− | not to have been written |
| PERFECT CONTINUOUS | 0+ | have been being written |
| | 0− | not have being written |
| | 1+ | to have being written |
| | 1− | not to have being written |

Fig. 6

| | | GERUND / PARTICIPLE 1 *active* |
|---|---|---|
| INDEFINITE | 0+ | writing |
| | 0− | not writing |
| | | (×) |
| PERFECT | 0+ | having written |
| | 0− | not having written |
| | | (×) |

Fig. 7

| GERUND / PARTICIPLE 1 *passive* | | |
|---|---|---|
| INDEFINITE | 0+ | being written |
| | 0- | not being written |
| | | |
| PERFECT | 0+ | having been written |
| | 0- | not having been written |
| | | |

Fig. 8

| PARTICIPLE 2 | |
|---|---|
| Regular | Irregular |
| walked | written |

Fig. 9

| S+ | | | S- | | | |
|---|---|---|---|---|---|---|
| I | come | home | I | don't | come | home |
| You | come | home | You | don't | come | home |
| He | comes | home | He | doesn't | come | home |
| She | comes | home | She | doesn't | come | home |
| It | comes | home | It | doesn't | come | home |
| We | come | home | We | don't | come | home |
| You | come | home | You | don't | come | home |
| They | come | home | They | don't | come | home |

S

AV matrix

Fig. 10

| QT1 (G?+) | | | | QT1 (G?-) | | | |
|---|---|---|---|---|---|---|---|
| Do | I | come | home? | Don't | I | come | home? |
| Do | you | come | home? | Don't | you | come | home? |
| Does | he | come | home? | Doesn't | he | come | home? |
| Does | she | come | home? | Doesn't | she | come | home? |
| Does | it | come | home? | Doesn't | it | come | home? |
| Do | we | come | home? | Don't | we | come | home? |
| Do | you | come | home? | Don't | you | come | home? |
| Do | they | come | home? | Don't | they | come | home? |

Fig. 11

| | QT1 (QW&G?+) | | | | | QT1 (QW&G?-) | | | |
|---|---|---|---|---|---|---|---|---|---|
| | do | I | come | home? | | don't | I | come | home? |
| | do | you | come | home? | | don't | you | come | home? |
| | does | he | come | home? | | doesn't | he | come | home? |
| Why | does | she | come | home? | Why | doesn't | she | come | home? |
| | does | it | come | home? | | doesn't | it | come | home? |
| | do | we | come | home? | | don't | we | come | home? |
| | do | you | come | home? | | don't | you | come | home? |
| | do | they | come | home? | | don't | they | come | home? |

Fig. 12

| | QT1 (QW&G?-)R | | | |
|---|---|---|---|---|
| | I | don't | come | home? |
| | you | don't | come | home? |
| | he | doesn't | come | home? |
| Why | she | doesn't | come | home? |
| | it | doesn't | come | home? |
| | we | don't | come | home? |
| | you | don't | come | home? |
| | they | don't | come | home? |

Fig. 13

| QT1 (S&DJ?+) | | | | | | | QT1 (S&DJ?-) | | | | | | |
|---|---|---|---|---|---|---|---|---|---|---|---|---|---|
| I | come | home, | don't | I | | ? | I | don't | come | home, | do | I | ? |
| You | come | home, | don't | you | | ? | You | don't | come | home, | do | you | ? |
| He | comes | home, | doesn't | he | | ? | He | doesn't | come | home, | does | he | ? |
| She | comes | home, | doesn't | she | | ? | She | doesn't | come | home, | does | she | ? |
| It | comes | home, | doesn't | it | | ? | It | doesn't | come | home, | does | it | ? |
| We | come | home, | don't | we | | ? | We | don't | come | home, | do | we | ? |
| You | come | home, | don't | you | | ? | You | don't | come | home, | do | you | ? |
| They | come | home, | don't | they | | ? | They | don't | come | home, | do | they | ? |

Fig. 14

| | QT2+ | | | QT2- | | |
|---|---|---|---|---|---|---|
| | come | home? | | don't | come | home? |
| | come | home? | | don't | come | home? |
| | comes | home? | | doesn't | come | home? |
| Q2S | comes | home? | Q2S | doesn't | come | home? |
| | comes | home? | | doesn't | come | home? |
| | come | home? | | don't | come | home? |
| | come | home? | | don't | come | home? |
| | come | home? | | don't | come | home? |
| Whose dog comes home? | | | Whose dog doesn't come home? | | | |
| Who reads it? | | | Who doesn't read it? | | | |

QT1

QT2

Fig. 15

| ACTIVE (TO BE) | | | | |
|---|---|---|---|---|
| | PAST | PRESENT | FUTURE | FUTURE-IN-THE-PAST |
| INDEFINITE | was/were | am/are/is | will be | would be |
| | *I was in park* | *I am in park* | *I will be in park* | *I would be in park* |
| CONTINUOUS | was/were +being | am/are/is +being | | |
| | *He was being stupid* | *I am being ill* | | |
| PERFECT | had +been | have/has +been | will have +been | would have +been |
| | *He had been there* | *He has been there* | *He will have been there* | *He would have been there* |
| PERFECT CONTINUOUS | | | | |

Fig. 16

| INFINITIVES (TO BE) *active* | | |
|---|---|---|
| INDEFINITE | 0+ | be |
| | 0- | not be |
| | 1+ | to be |
| | 1- | not to be |
| CONTINUOUS | 0+ | be being |
| | 0- | not be being |
| | 1+ | to be being |
| | 1- | not to be being |
| PERFECT | 0+ | have been |
| | 0- | not have been |
| | 1+ | to have been |
| | 1- | not to have been |
| | | |

Fig. 17

| GERUND / PARTICIPLE 1 (TO BE) active |||
|---|---|---|
| INDEFINITE | 0+ | being |
| | 0− | not being |
| | | |
| PERFECT | 0+ | having been |
| | 0− | not having been |
| | | |

Fig. 18

| PARTICIPLE 2 (TO BE) |
|---|
| been |

Fig. 19

| S+ | | | S- | | |
|---|---|---|---|---|---|
| I | am | in park | I | ain't | in park |
| You | are | in park | You | aren't | in park |
| He | is | in park | He | isn't | in park |
| She | is | in park | She | isn't | in park |
| It | is | in park | It | isn't | in park |
| We | are | in park | We | aren't | in park |
| You | are | in park | You | aren't | in park |
| They | are | in park | They | aren't | in park |

S ] 2B matrix

Fig. 20

| QT1 (G?+) | | | | QT1 (G?-) | | | |
|---|---|---|---|---|---|---|---|
| Am | I | in park | ? | Ain't | I | in park | ? |
| Are | you | in park | ? | Aren't | you | in park | ? |
| Is | he | in park | ? | Isn't | he | in park | ? |
| Is | she | in park | ? | Isn't | she | in park | ? |
| Is | it | in park | ? | Isn't | it | in park | ? |
| Are | we | in park | ? | Aren't | we | in park | ? |
| Are | you | in park | ? | Aren't | you | in park | ? |
| Are | they | in park | ? | Aren't | they | in park | ? |

Fig. 21

| | QT1 (QW&G?+) | | | | | QT1 (QW&G?-) | | | |
|---|---|---|---|---|---|---|---|---|---|
| | am | I | in park | ? | | ain't | I | in park | ? |
| | are | you | in park | ? | | aren't | you | in park | ? |
| | is | he | in park | ? | | isn't | he | in park | ? |
| Why | is | she | in park | ? | Why | isn't | she | in park | ? |
| | is | it | in park | ? | | isn't | it | in park | ? |
| | are | we | in park | ? | | aren't | we | in park | ? |
| | are | you | in park | ? | | aren't | you | in park | ? |
| | are | they | in park | ? | | aren't | they | in park | ? |

Fig. 22

| | QT1 (QW&G?-)R | | | |
|---|---|---|---|---|
| | I | ain't | in park | ? |
| | you | aren't | in park | ? |
| | he | isn't | in park | ? |
| Why | she | isn't | in park | ? |
| | it | isn't | in park | ? |
| | we | aren't | in park | ? |
| | you | aren't | in park | ? |
| | they | aren't | in park | ? |

Fig. 23

| QT1 (S&DJ?+) | | | | | | QT1 (S&DJ?-) | | | | | |
|---|---|---|---|---|---|---|---|---|---|---|---|
| I | am | in park | ain't | I | ? | I | ain't | in park | am | I | ? |
| You | are | in park | aren't | you | ? | You | aren't | in park | are | you | ? |
| He | is | in park | isn't | he | ? | He | isn't | in park | is | he | ? |
| She | is | in park | isn't | she | ? | She | isn't | in park | is | she | ? |
| It | is | in park | isn't | it | ? | It | isn't | in park | is | it | ? |
| We | are | in park | aren't | we | ? | We | aren't | in park | are | we | ? |
| You | are | in park | aren't | you | ? | You | aren't | in park | are | you | ? |
| They | are | in park | aren't | they | ? | They | aren't | in park | are | they | ? |

Fig. 24

| | QT2+ | | | QT2- | |
|---|---|---|---|---|---|
| | am | in park? | | ain't | in park? |
| | are | in park? | | aren't | in park? |
| | is | in park? | | isn't | in park? |
| Q2S | is | in park? | Q2S | isn't | in park? |
| | is | in park? | | isn't | in park? |
| | are | in park? | | aren't | in park? |
| | are | in park? | | aren't | in park? |
| | are | in park? | | aren't | in park? |
| Whose dogs are in park? | | | Whose dogs aren't there yet? | | |
| Who is in park? | | | Who isn't here? | | |

QT1    QT2

Fig. 25

| S+ | | | S- | | |
|---|---|---|---|---|---|
| I | can | read | I | can't | read |
| You | can | read | You | can't | read |
| He | can | read | He | can't | read |
| She | can | read | She | can't | read |
| It | can | read | It | can't | read |
| We | can | read | We | can't | read |
| You | can | read | You | can't | read |
| They | can | read | They | can't | read |

S

AUX- modals matrix

Fig. 26

| QT1 (G?+) | | | | QT1 (G?-) | | | |
|---|---|---|---|---|---|---|---|
| Can | I | read | ? | Can't | I | read | ? |
| Can | you | read | ? | Can't | you | read | ? |
| Can | he | read | ? | Can't | he | read | ? |
| Can | she | read | ? | Can't | she | read | ? |
| Can | it | read | ? | Can't | it | read | ? |
| Can | we | read | ? | Can't | we | read | ? |
| Can | you | read | ? | Can't | you | read | ? |
| Can | they | read | ? | Can't | they | read | ? |

Fig. 27

| | QT1 (QW&G?+) | | | | | QT1 (QW&G?-) | | | |
|---|---|---|---|---|---|---|---|---|---|
| | can | I | read | ? | | can't | I | read | ? |
| | can | you | read | ? | | can't | you | read | ? |
| | can | he | read | ? | | can't | he | read | ? |
| What | can | she | read | ? | What | can't | she | read | ? |
| | can | it | read | ? | | can't | it | read | ? |
| | can | we | read | ? | | can't | we | read | ? |
| | can | you | read | ? | | can't | you | read | ? |
| | can | they | read | ? | | can't | they | read | ? |

Fig. 28

| | QT1 (QW&G?-)R | | |
|---|---|---|---|
| | I | can't | read | ? |
| | you | can't | read | ? |
| | he | can't | read | ? |
| Why | she | can't | read | ? |
| | it | can't | read | ? |
| | we | can't | read | ? |
| | you | can't | read | ? |
| | they | can't | read | ? |

Fig. 29

| QT1 (S&DJ?+) | | | | | | QT1 (S&DJ?-) | | | | | |
|---|---|---|---|---|---|---|---|---|---|---|---|
| I | can | read | can't | I | ? | I | can't | read | can | I | ? |
| You | can | read | can't | you | ? | You | can't | read | can | you | ? |
| He | can | read | can't | he | ? | He | can't | read | can | he | ? |
| She | can | read | can't | she | ? | She | can't | read | can | she | ? |
| It | can | read | can't | it | ? | It | can't | read | can | it | ? |
| We | can | read | can't | we | ? | We | can't | read | can | we | ? |
| You | can | read | can't | you | ? | You | can't | read | can | you | ? |
| They | can | read | can't | they | ? | They | can't | read | can | they | ? |

Fig. 30

| | QT2+ | | | QT2- | |
|---|---|---|---|---|---|
| | can | read? | | can't | read? |
| | can | read? | | can't | read? |
| | can | read? | | can't | read? |
| Q2S | can | read? | Q2S | can't | read? |
| | can | read? | | can't | read? |
| | can | read? | | can't | read? |
| | can | read? | | can't | read? |
| | can | read? | | can't | read? |
| Whose kid can read? | | | Whose kids can't read? | | |
| Who can read? | | | Who can't read? | | |

QT1

QT2

AUX+ modals matrix

Fig. 31

| S+ | | | S- | | | |
|---|---|---|---|---|---|---|
| I | have to | read | I | don't | have to | read |
| You | have to | read | You | don't | have to | read |
| He | has to | read | He | doesn't | have to | read |
| She | has to | read | She | doesn't | have to | read |
| It | has to | read | It | doesn't | have to | read |
| We | have to | read | We | don't | have to | read |
| You | have to | read | You | don't | have to | read |
| They | have to | read | They | don't | have to | read |

Fig. 32

| QT1 (G?+) | | | | QT1 (G?-) | | | |
|---|---|---|---|---|---|---|---|
| Do | I | have to | read? | Don't | I | have to | read? |
| Do | you | have to | read? | Don't | you | have to | read? |
| Does | he | have to | read? | Doesn't | he | have to | read? |
| Does | she | have to | read? | Doesn't | she | have to | read? |
| Does | it | have to | read? | Doesn't | it | have to | read? |
| Do | we | have to | read? | Don't | we | have to | read? |
| Do | you | have to | read? | Don't | you | have to | read? |
| Do | they | have to | read? | Don't | they | have to | read? |

Fig. 33

| | QT1 (QW&G?+) | | | | | QT1 (QW&G?-) | | | |
|---|---|---|---|---|---|---|---|---|---|
| | do | I | have to | read? | | don't | I | have to | read? |
| | do | you | have to | read? | | don't | you | have to | read? |
| | does | he | have to | read? | | doesn't | he | have to | read? |
| Why | does | she | have to | read? | Why | doesn't | she | have to | read? |
| | does | it | have to | read? | | doesn't | it | have to | read? |
| | do | we | have to | read? | | don't | we | have to | read? |
| | do | you | have to | read? | | don't | you | have to | read? |
| | do | they | have to | read? | | don't | they | have to | read? |

Fig. 34

| | QT1 (QW&G?-)R | | | |
|---|---|---|---|---|
| | I | don't | have to | read? |
| | you | don't | have to | read? |
| | he | doesn't | have to | read? |
| | she | doesn't | have to | read? |
| Why | it | doesn't | have to | read? |
| | we | don't | have to | read? |
| | you | don't | have to | read? |
| | they | don't | have to | read? |

Fig. 35

| QT1 (S&DJ?+) | | | | | | | QT1 (S&DJ?-) | | | | | | | |
|---|---|---|---|---|---|---|---|---|---|---|---|---|---|---|
| I | have to | read | don't | I | | ? | I | don't | have to | read | do | I | | ? |
| You | have to | read | don't | you | | ? | You | don't | have to | read | do | you | | ? |
| He | has to | read | doesn't | he | | ? | He | doesn't | have to | read | does | he | | ? |
| She | has to | read | doesn't | she | | ? | She | doesn't | have to | read | does | she | | ? |
| It | has to | read | doesn't | it | | ? | It | doesn't | have to | read | does | it | | ? |
| We | have to | read | don't | we | | ? | We | don't | have to | read | do | we | | ? |
| You | have to | read | don't | you | | ? | You | don't | have to | read | do | you | | ? |
| They | have to | read | don't | they | | ? | They | don't | have to | read | do | they | | ? |

Fig. 36

| | QT2+ | | | QT2- | | |
|---|---|---|---|---|---|---|
| | have to | read | | don't | have to | read |
| | have to | read | | don't | have to | read |
| | has to | read | | doesn't | have to | read |
| Q2S | has to | read | Q2S | doesn't | have to | read |
| | has to | read | | doesn't | have to | read |
| | have to | read | | don't | have to | read |
| | have to | read | | don't | have to | read |
| | have to | read | | don't | have to | read |
| Whose children have to read? | | | Whose children don't have to read? | | | |
| Who has to read? | | | Who doesn't have to read? | | | |

S

QT1

QT2

Fig. 37
| PAST | PRESENT | FUTURE | FUTURE-IN-THE-PAST | |
|---|---|---|---|---|
| COULD | CAN | WILL BE ABLE TO | WOULD BE ABLE TO | can |
| You *could* do it yesterday | I *can* read | You *will be able to* do it | She *would be able to* do it | |
Fig. 38
| INDEFINITE | 0+ | write |
|---|---|---|
| | 0- | not write |
| | 1+ | to write |
| | 1- | not to write |
Fig 39
| INDEFINITE | 0+ | writing |
|---|---|---|
| | 0- | not writing |
Fig. 40
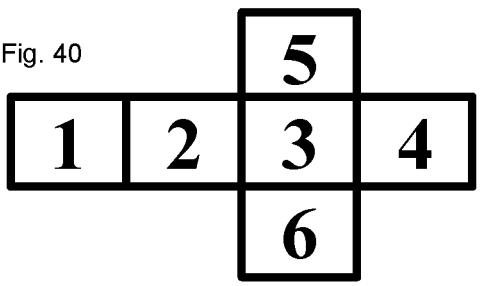
Fig. 41
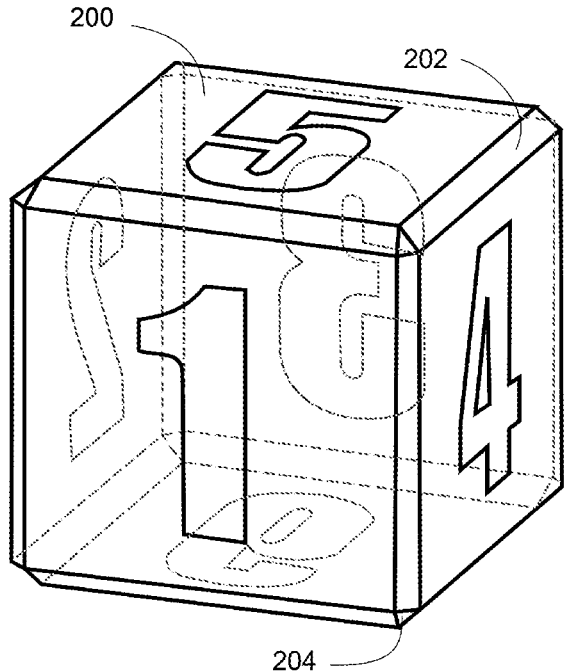

ACTIVE

PASSIVE

FRONT

Gerund/Participle 1

Participle 2

| Pa | Pr | Fu | FuiP |

Infinitives

P.CON | PER | CON | IND

GRAMMAR ORGANIZER

CROSS-REFERENCE TO RELATED APPLICATION

This application claims the benefit of provisional patent application Ser. No. 62/358,606, filed 2016 Jul. 6 by the present inventor.

BACKGROUND—PRIOR ART

The following is prior art that presently appears relevant:

US patents

| Patent Number | Code | Issue Date | Patentee |
| --- | --- | --- | --- |
| 4,478,582 | G09B1/34 | Oct. 23, 1984 | Tucker |
| 4,613,309 | G09B19/06 | Sep. 23, 1986 | McCloskey |
| 5,535,121 | G06F17/274 | Jul. 9, 1996 | Roche et al. |
| 6,022,222 | G09B5/065 | Feb. 8, 2000 | Guinan |
| 2003/0031987 | G09B19/04 | Feb. 13, 2003 | Gore et al. |

Foreign patent documents

| Foreign Doc. Nr | Cntry Code | Code | Pub. Dt | App or Patentee |
| --- | --- | --- | --- | --- |
| 202258018U | CN | G09B19/06 | May 30, 2012 | Feng Zhao |
| 140112 | RU | G09B19/06 | Apr. 27, 2014 | Petr A. Stepichev |
| 2908284 | EU | G09B5/12 | Aug. 19, 2015 | Lee Ju Hwan |

Non-patent literature documents

Betty S. Azar, "Understanding and Using English Grammar", published by Prentice-Hall, Inc., 1981

This application relates to teaching and learning aids. In particular, it relates to aids for articulation of English language verb-related grammar.

English is a well-structured language. Nevertheless, many students find it difficult to learn. There were attempts to make English learning easier. For example, one can consider a U.S. Pat. No. 4,478,582 to Tucker (1984), U.S. Pat. No. 4,613,309 to McCloskey (1986), U.S. Pat. No. 6,022,222 to Guinan (2000) and US patent #2003/0031987 to Gore et al (2003). Authors try to simplify learning through figures, symbols and codes. Result, however, is far from expected. In fact, it becomes even more complicated.

There is another approach. One can take the most complex part of a language and focus on it. The most complex part of any language is a verb. Professionals know various schemes and charts that help with learning English verbs and tenses. Betty S. Azar's tenses chart from a book "Understanding and Using English Grammar", FIG. 1 is a widely-recognized example. Similar chart is in US patent #2003/0031987 to Gore et al. in FIG. 2, sheet 2. Innovative teachers modify such charts according to their needs. Example modification is a Chinese patent CN 202258018U to Feng Zhao (2012). However, there is a drawback in all those solutions. They don't provide sentence-building rules inside tenses. A Russian patent RU 140112 to Petr A. Stepichev (2014) is an attempt to approach this problem. In that patent, joined cubic blocks rotate on axis and build sentences. This approach explains sentence-building rules for individual tenses. However, it doesn't produce a systematic picture. It doesn't explain how individual tenses relate to the whole system of English verb-related grammar.

Given above highlights an unmet demand. Students and teachers need a unified system that would picture all verb-related grammar in full variety. There were attempts to build such system. One of examples is a U.S. Pat. No. 5,535,121 to Roche (1996), FIG. 4C, sheet 4 and FIG. 4D, sheet 5. However, this example looks complicated and isn't practical. There is also EU patent #2,908,284 to Lee Ju Hwan (2012) with attempt to address the same problem, FIGS. 1A, 1B, 3, 4, 8. Practical value of such approach is also questionable.

In conclusion, insofar as I am aware, there isn't educational tool for efficient articulation of all verb-related grammar of English language. There is also no system for convenient navigation across numerous verb-related grammar rules.

SUMMARY

All verb-related words of English language form several groups—Grammar Units (GU). Each GU is an item of a structured description of a verb-related grammar for its category. Each GU consists of one reference table or a structured multi-level plurality of reference tables. Each GU sits on a devoted face of a solid body. A solid body serves as a basis for all GUs and makes navigation among GUs easy. A solid body with GUs on it is a system. This system articulates verb-related grammar of English language in its full diversity and makes it navigable. One (but not limited to) of possible embodiments of such system is a Grammar Cube.

ADVANTAGES

Spacial distinction between different faces of the Grammar Cube simplifies verb-related grammar presentation and navigation. It naturally articulates differences between verb-related categories. It also allows articulation of complex grammar structures of sentences. Verb-related parts of sentences bear the same colors as their dedicated faces of the cube. It enhances ability of students to recognize, analyze and learn verb-related parts of a sentence. Abstract grammar theory put on Grammar Cube faces becomes simple. With Grammar Cube as a teaching-aid and learning tool, verb-related grammar teaching and learning comes naturally.

Further advantages will become apparent from a study of following description and accompanying figures.

DRAWINGS—FIGURES

FIG. 1—active tenses chart by Betty S. Azar.

FIG. 2—active Finitives Grammar Chart with grammar formulas and examples (Azar's chart with example sentence/phrase for each tense) for action verbs (AV).

FIG. 3—passive Finitives Grammar Chart with grammar formulas and examples for action verbs (AV). Dino shapes show obsolete tenses of English language.

FIG. 4—active Infinitives Grammar Chart for action verbs (AV).

FIG. 5—passive Infinitives Grammar Chart for action verbs (AV).

FIG. 6—active Gerund/Participle 1 Grammar Chart for action verbs (AV).

FIG. 7—passive Gerund/Participle 1 Grammar Chart for action verbs (AV).

FIG. 8—Participle 2 reference table for action verbs (AV).

FIG. 9-14—example matrix for action verbs (AV).

FIG. 15—active Finitives Grammar Chart for verb "to be" (2B) with grammar formulas and examples. Dino shapes show obsoleting tenses.

FIG. 16—active Infinitives Grammar Chart for verb "to be" (2B).

FIG. 17—active Gerund/Participle 1 Grammar Chart for verb "to be" (2B).

FIG. 18—Participle 2 reference table for verb "to be" (2B).

FIG. 19-24—matrix for verb "to be" (2B).

FIG. 25-30—"AUX−" example matrix of modal verbs.

FIG. 31-36—"AUX+" example matrix of modal verbs.

FIG. 37—Grammar Chart for modal verbs.

FIG. 38—example reference table, Infinitives (AV/2B).

FIG. 39—example reference table, Participles 1/Gerunds (AV/2B).

FIG. 40—Grammar Cube sides numbered in 2D.

FIG. 41—Grammar Cube sides numbered in 3D.

FIG. 42—top view of Grammar Cube. Full modal verbs (1)—on, semi-modal verbs (½)—off.

Figure 43:
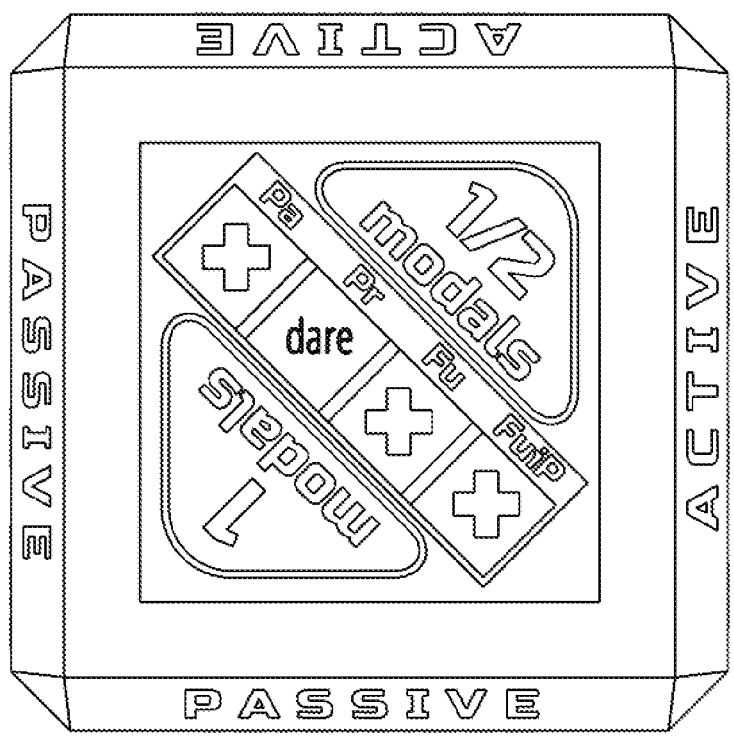

FIG. 43—top view of Grammar Cube. Semi-modal verbs (%)—on, full modal verbs (1)—off.

Figure 44:
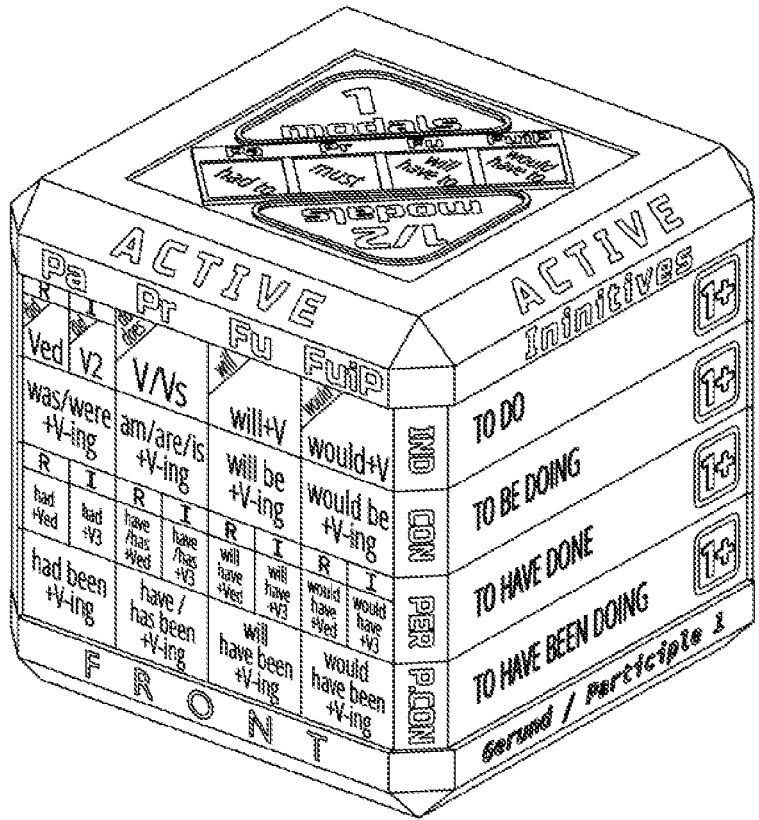

FIG. 44—3D projection view of Grammar Cube (top-front).

Figure 45:
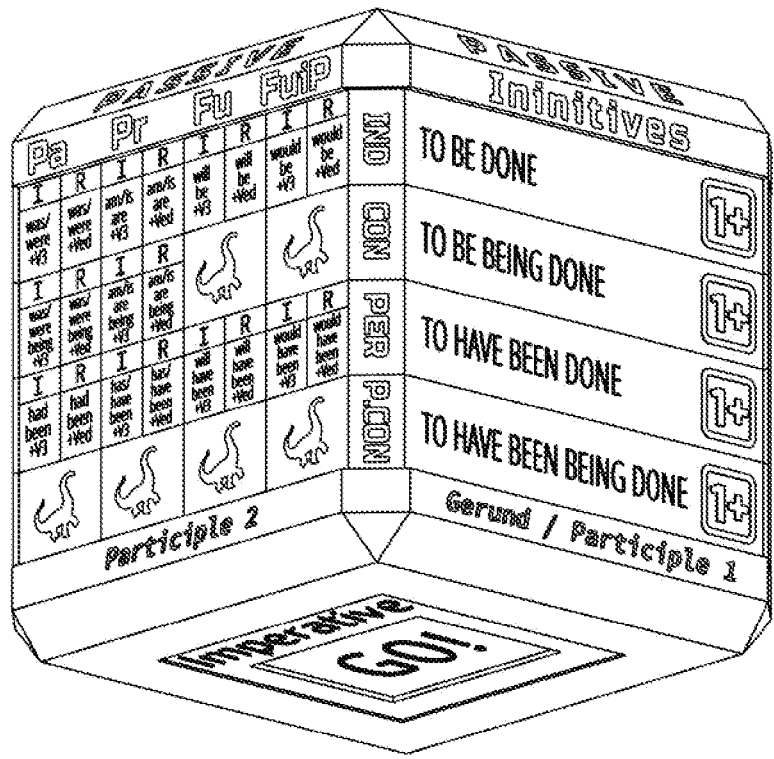

FIG. 45—3D projection view of Grammar Cube (bottom-back).

Figures 46, 47, 48, 49, 50, 51, 52, 53, 54:
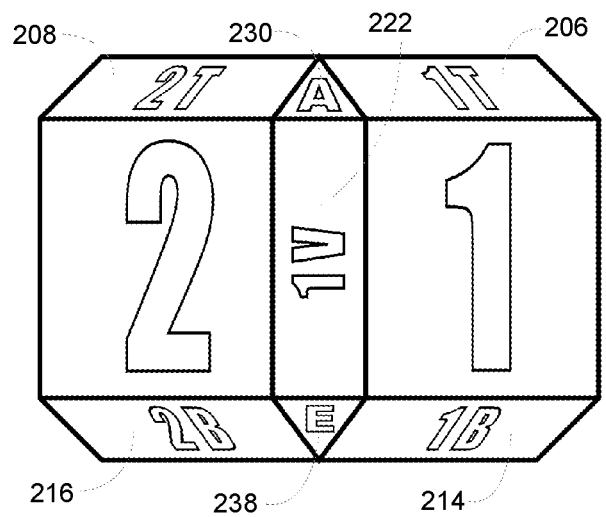
Figure 55:
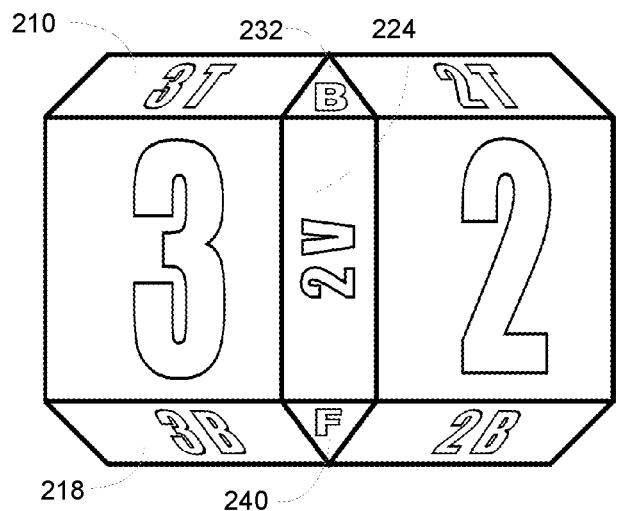
Figure 56:
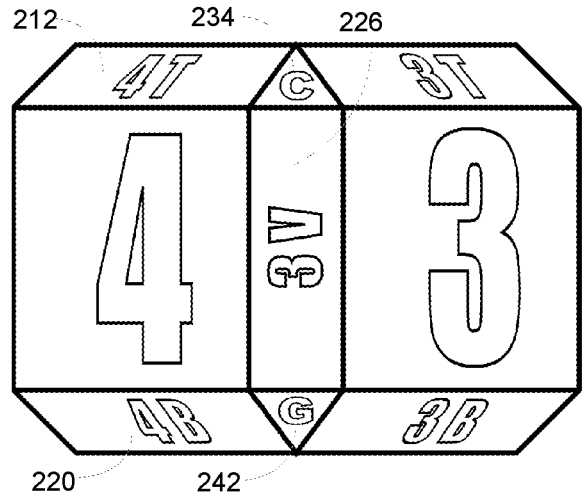
Figure 57:
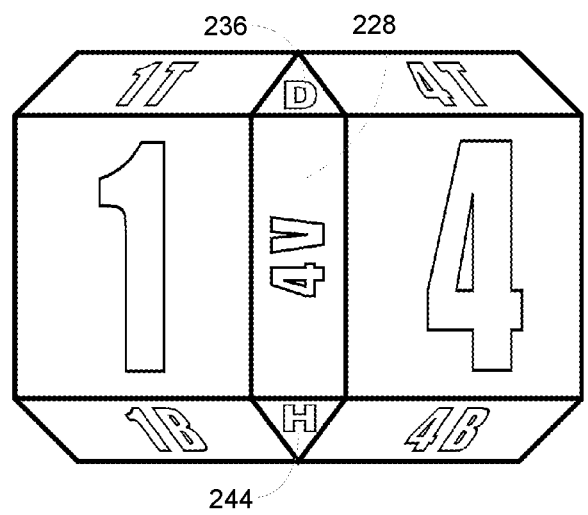

FIG. 46—aspects sign.

FIG. 47—active voice sign.

FIG. 48—passive voice sign.

FIG. 49—front sign.

FIG. 50—Gerund/Participle 1 sign.

FIG. 51—Participle 2 sign.

FIG. 52—tenses sign.

FIG. 53—infinitives sign.

FIGS. 54-57—indexed positions of service surfaces on Grammar Cube.

Figure 58:
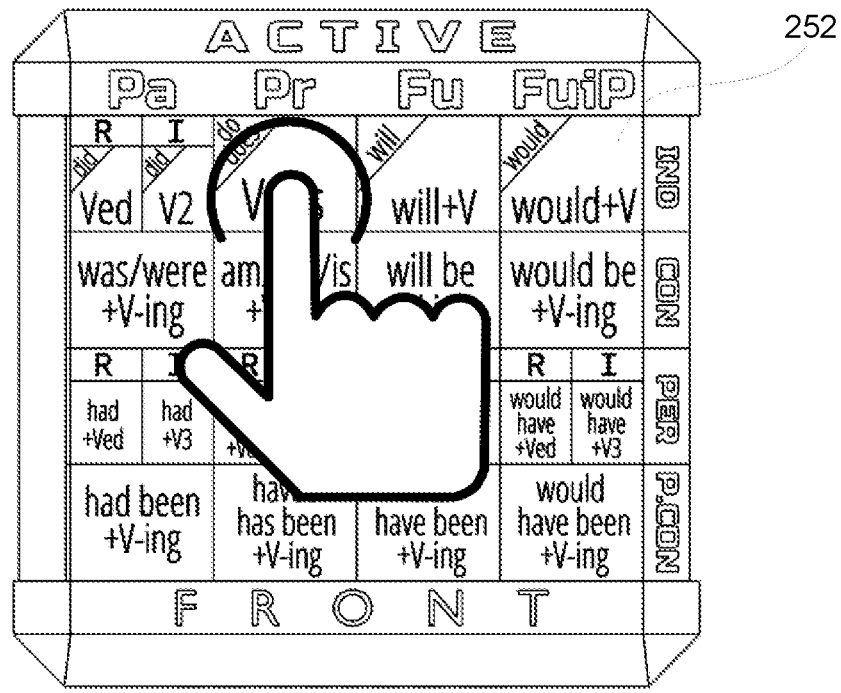
Figure 59:
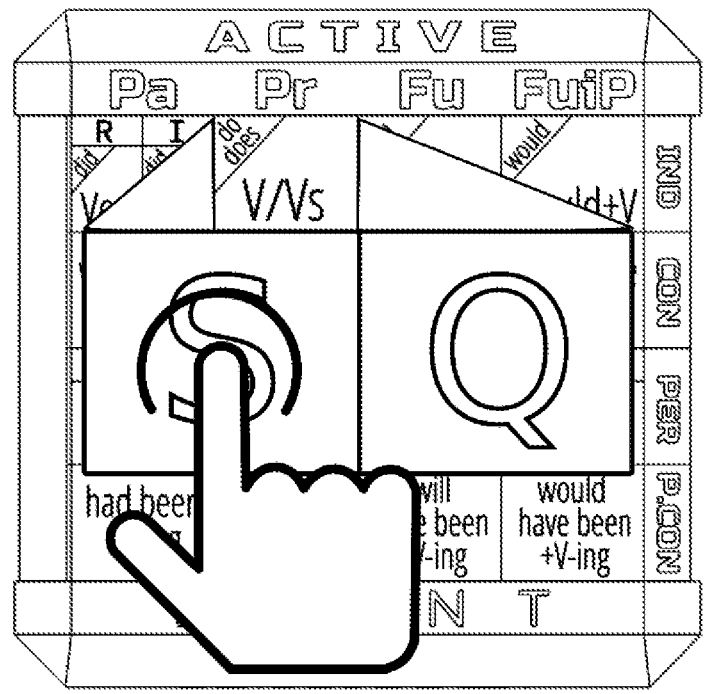
Figure 60:
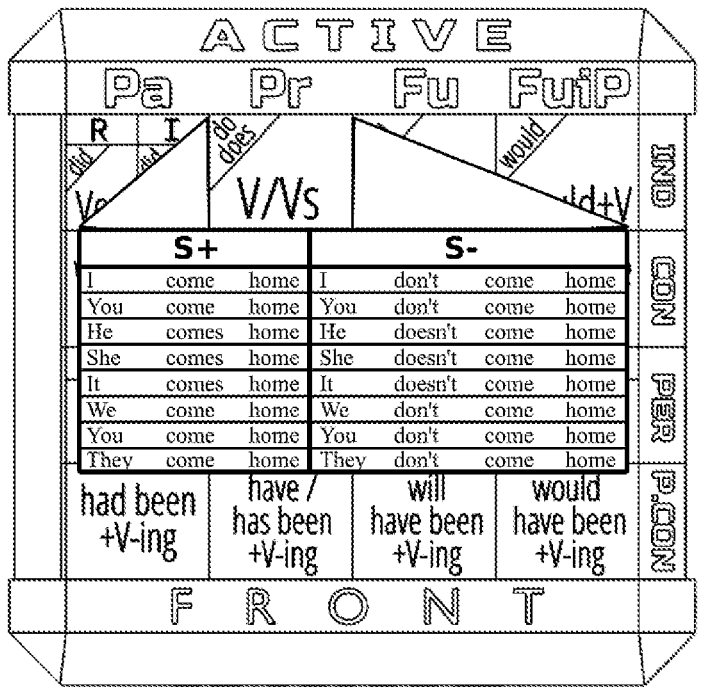

FIG. 58-60—using Grammar Cube as a Present Indefinite Active tense reference (sequence).

Figure 61:
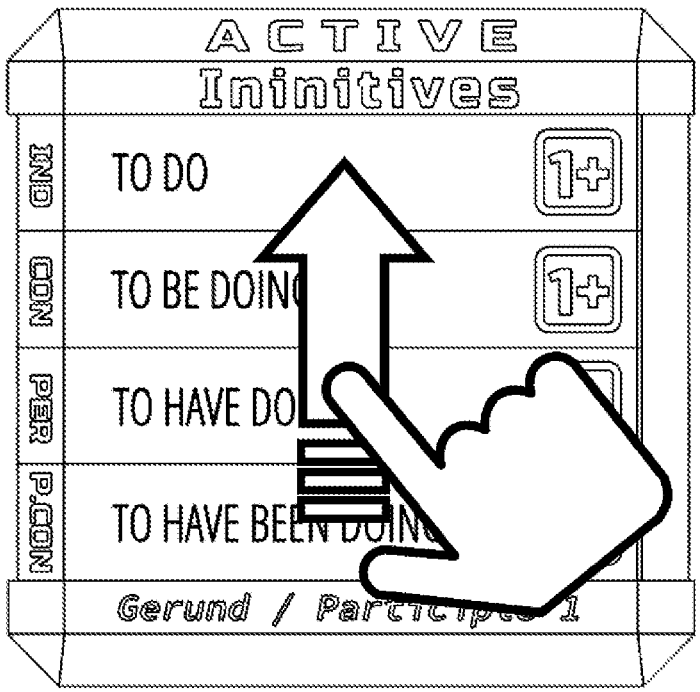

FIG. 61—finger swipe movement for showing OD (on-demand) layer.

Figure 62:
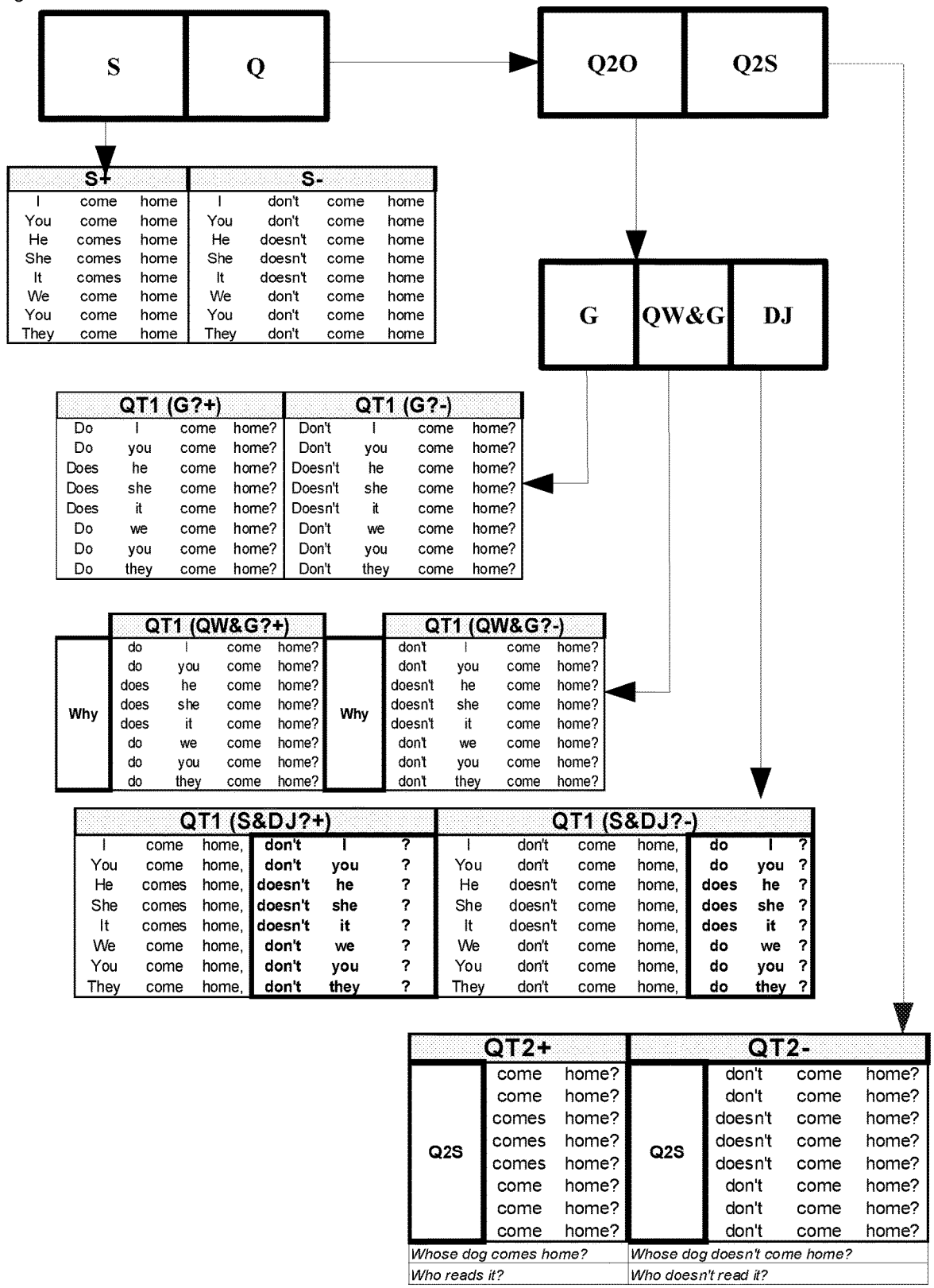
Figure 63:
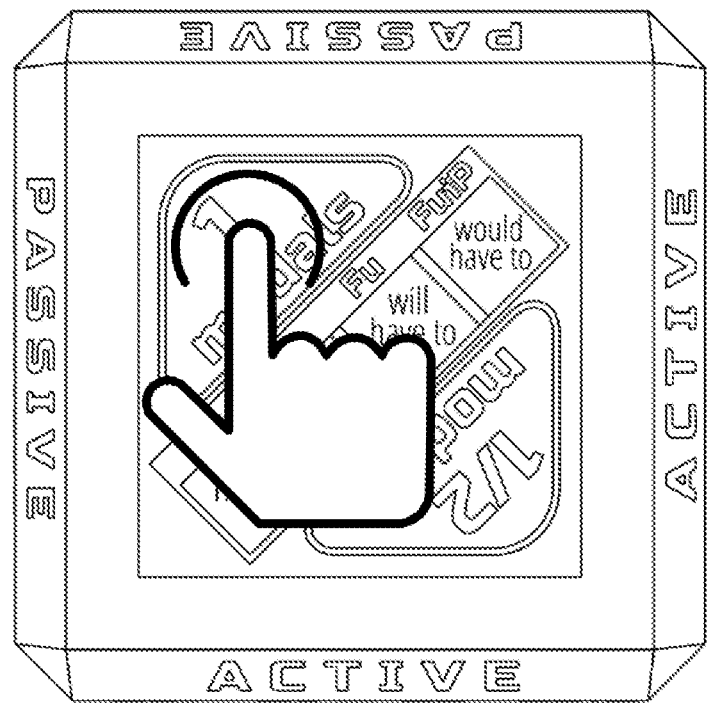
Figure 64:
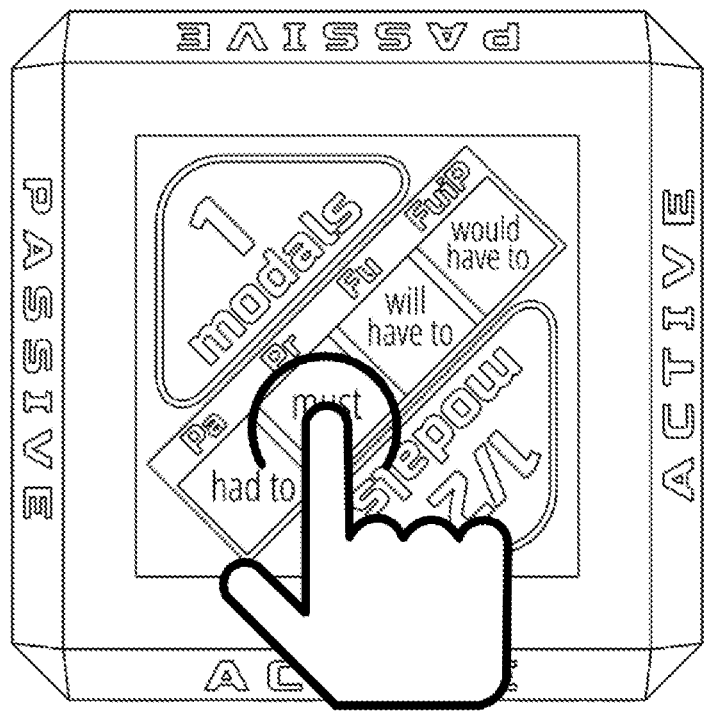
Figure 65:
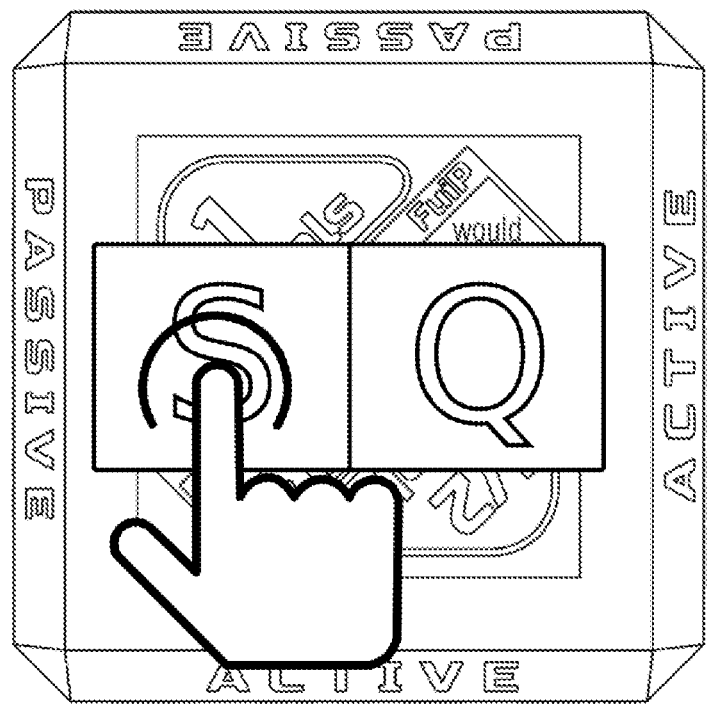

FIG. 62—algorithm of dialogue windows behavior for Present Indefinite Active tense.

FIG. 63-66—using Grammar Cube as a reference for modal verb "must".

Figure 67:
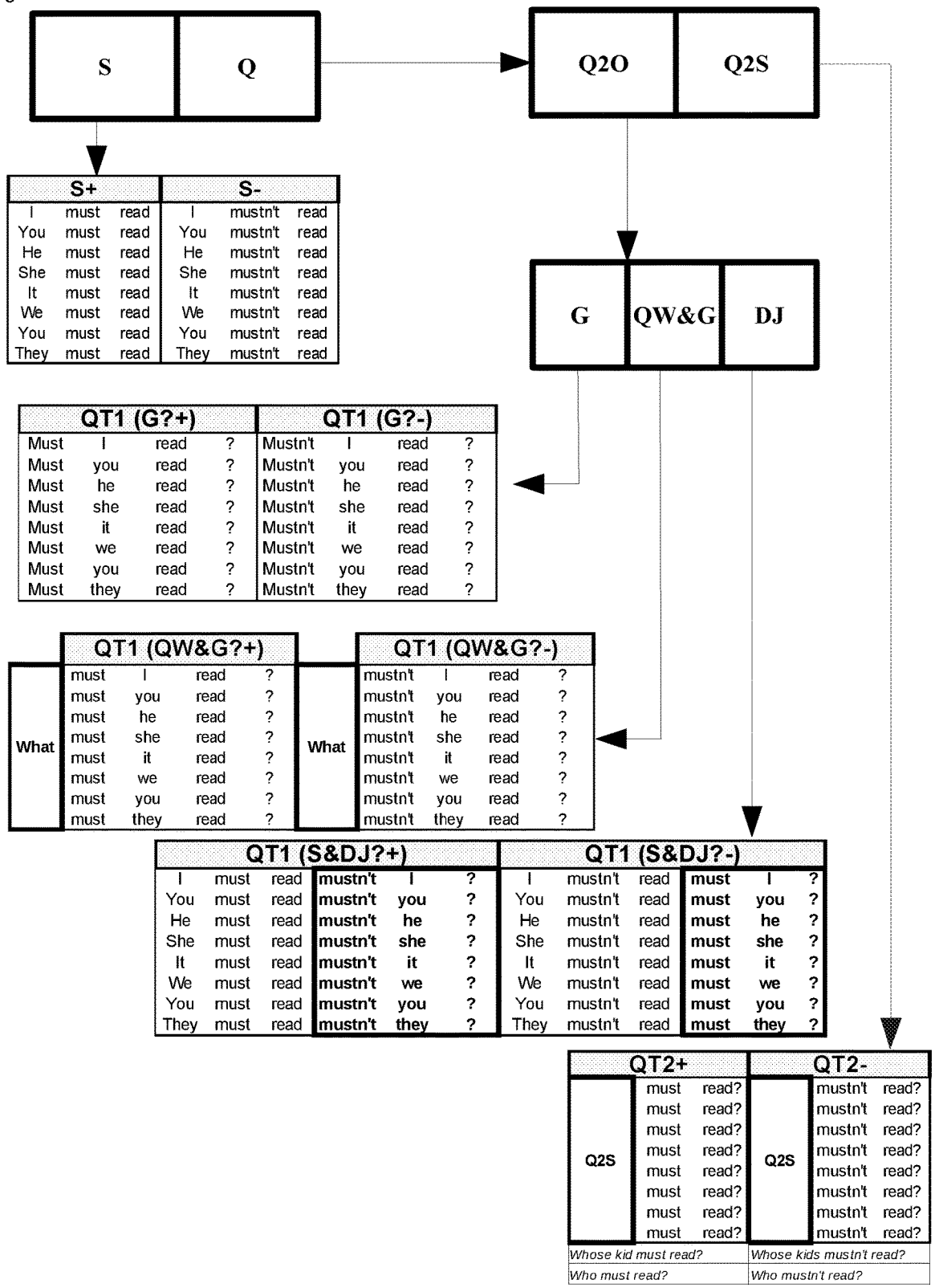

FIG. 67—algorithm of dialogue windows behavior for modal verb "must".

Figure 68:
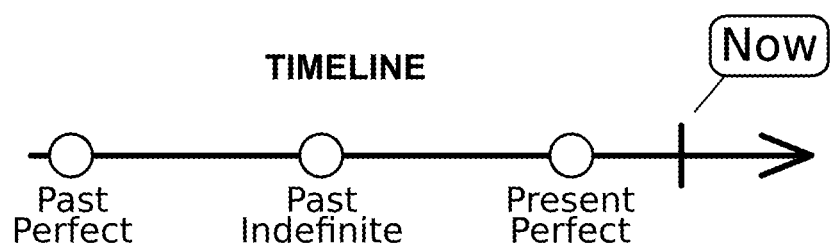

FIG. 68—time-line of English tenses.

Figure 69:
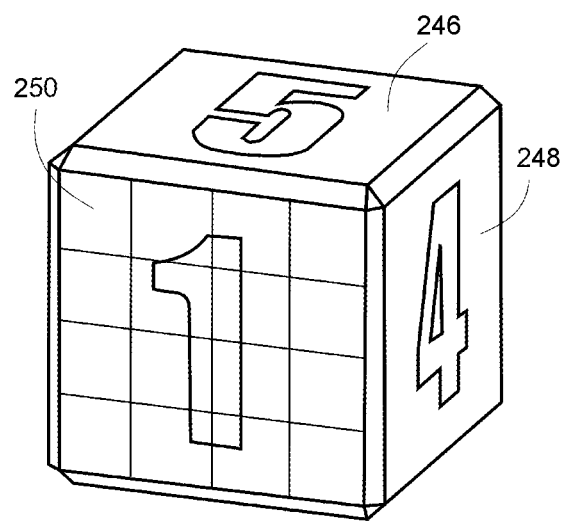

FIG. 69—whole 246, 248 and tiled 250 faces of Grammar Cube.

Figure 70:
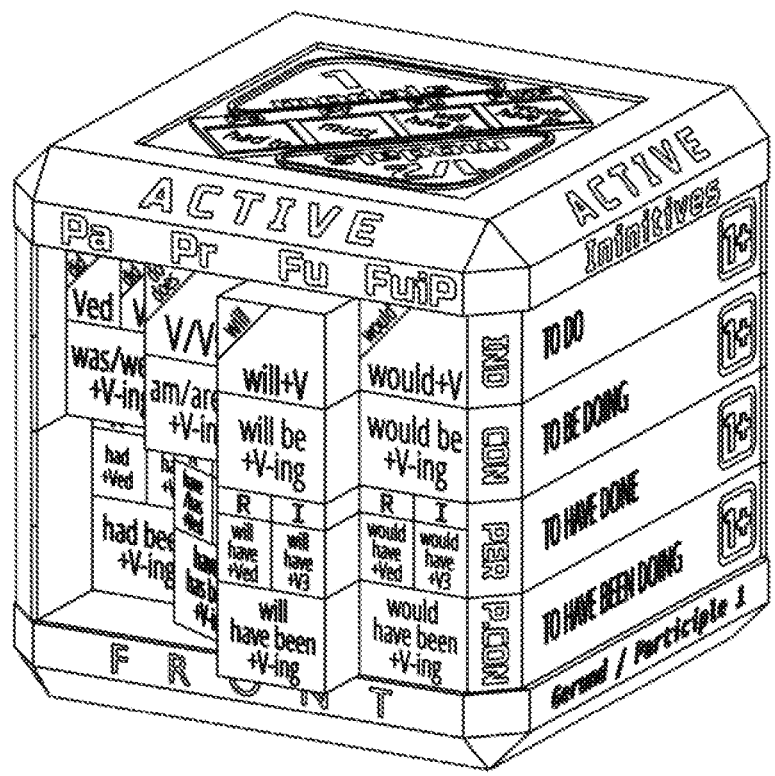

FIG. 70—transformed Grammar Cube after TimeStairs function activated (AV). Active voice sides of the cube.

Figure 71:
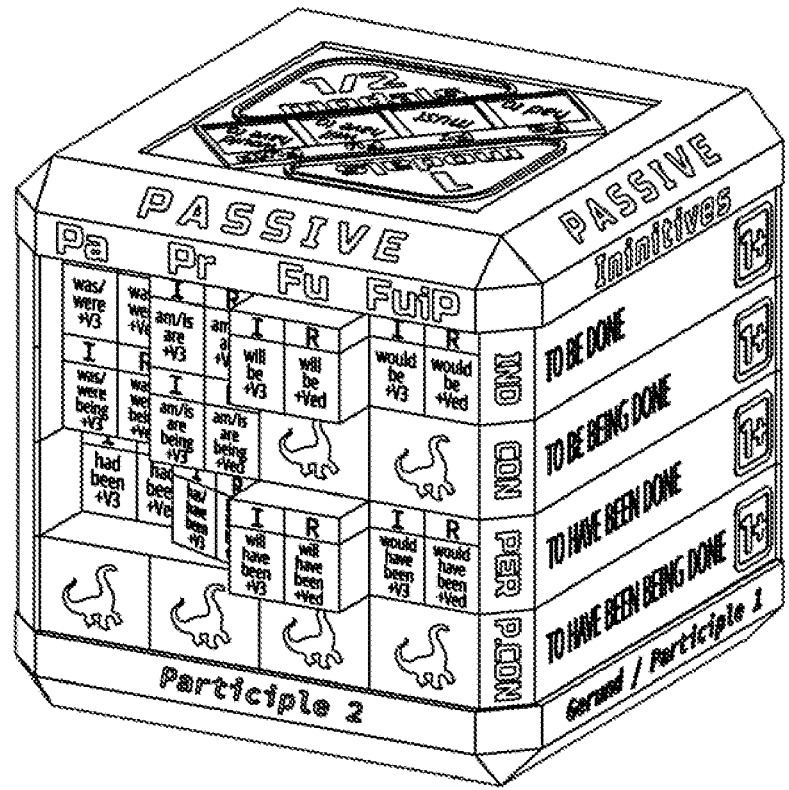

FIG. 71—transformed Grammar Cube after TimeStairs function activated (AV). Passive voice sides of the cube.

Figure 72:
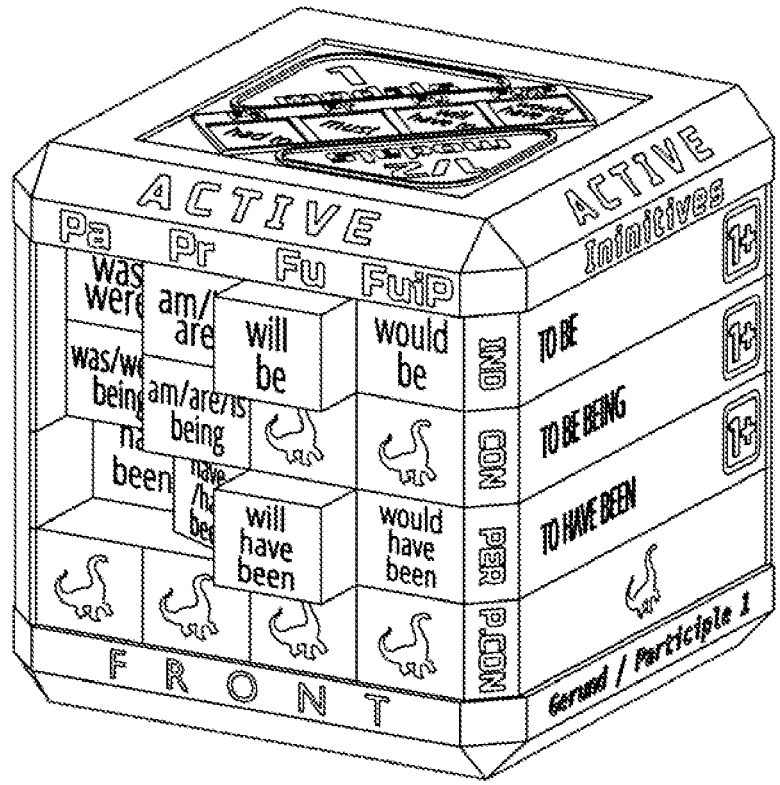

FIG. 72—transformed Grammar Cube after TimeStairs function activated (2B). Active voice side of the cube.

Figure 73:
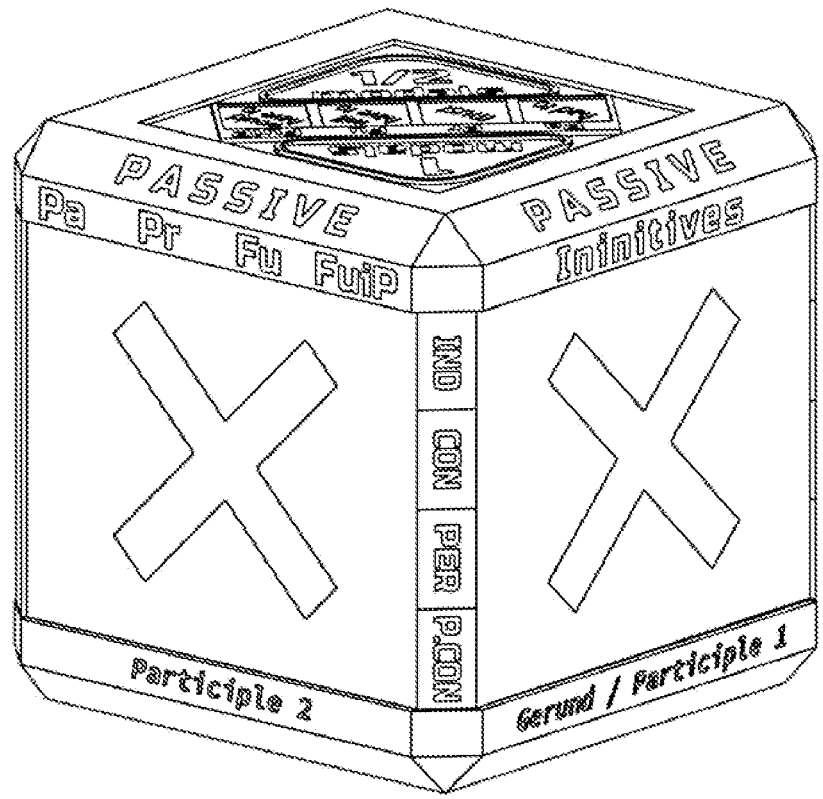

FIG. 73—Grammar Cube after TimeStairs function activated (2B). Passive voice side of the cube.

Figure 74:
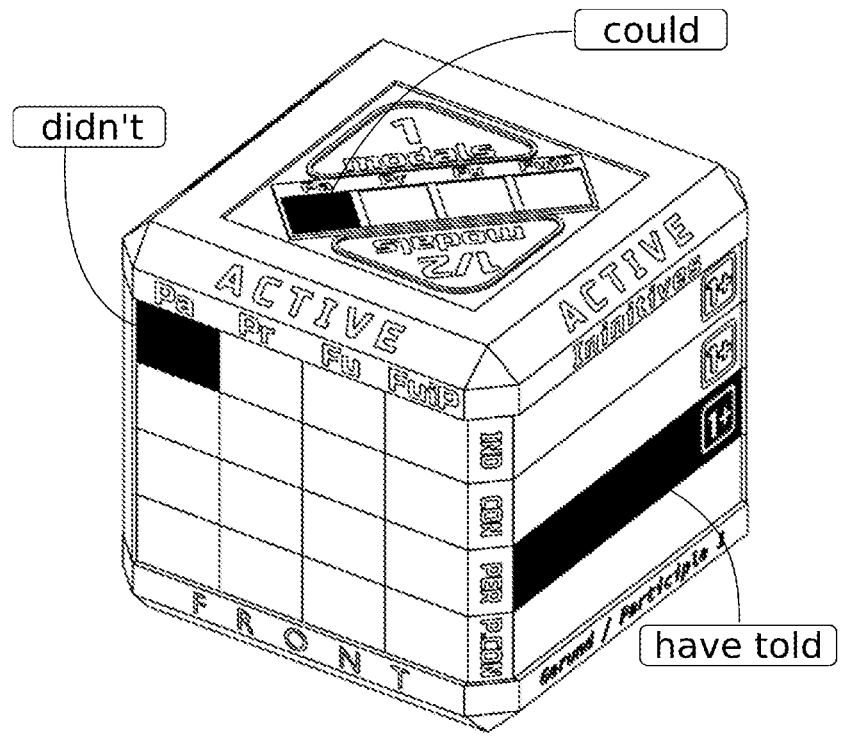

FIG. 74—example of ColorDance function.

Figure 75:

FIG. 75—example of educational workspace with Grammar Cube in upper-left corner.

Figure 76:
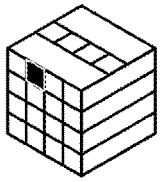

FIG. 76—example of word-processor interface with Grammar Cube.

Figure 77:
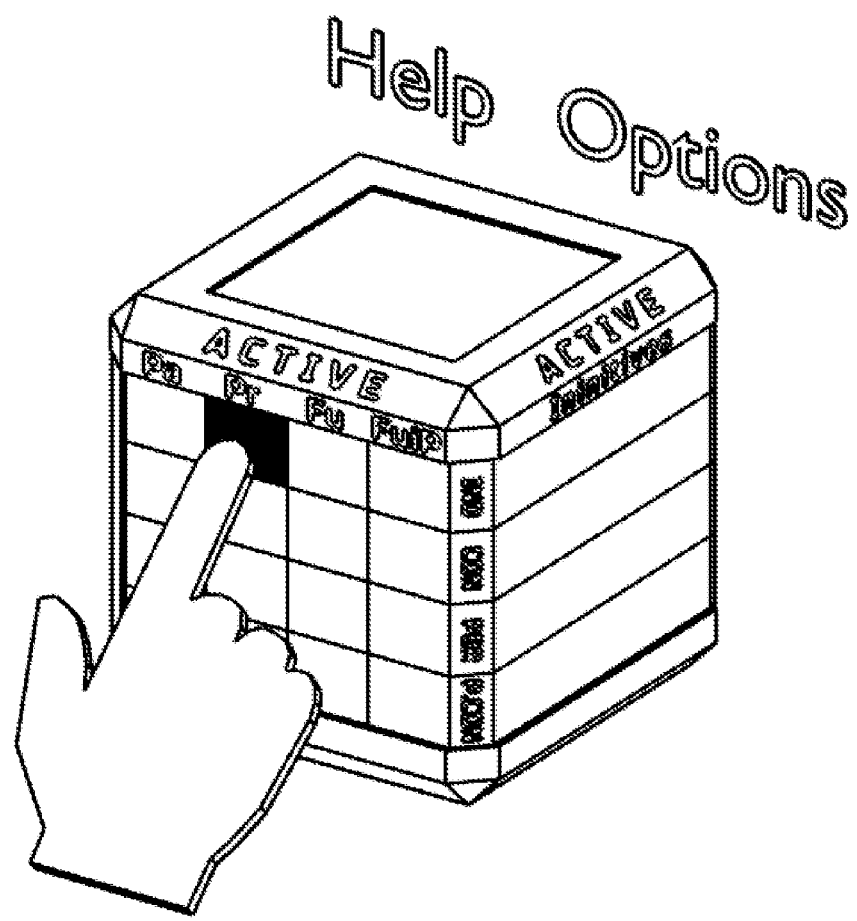

FIG. 77—example of Grammar Cube in virtual/augmented reality.

| DRAWINGS - REFERENCE NUMERALS | | |
|---|---|---|
| Ref# | Part Name | FIG. # |
| 200 | main surface | 41 |
| 202 | service bar | 41 |
| 204 | service corner | 41 |
| 206 | 1T (top) service bar | 54 |
| 208 | 2T (top) service bar | 54 |
| 210 | 3T (top) service bar | 55 |
| 212 | 4T (top) service bar | 56 |
| 214 | 1B (bottom) service bar | 54 |
| 216 | 2B (bottom) service bar | 54 |
| 218 | 3B (bottom) service bar | 55 |
| 220 | 4B (bottom) service bar | 56 |
| 222 | 1V (vertical) service bar | 54 |
| 224 | 2V (vertical) service bar | 55 |
| 226 | 3V (vertical) service bar | 56 |
| 228 | 4V (vertical) service bar | 57 |
| 230 | A top service corner | 54 |
| 232 | B top service corner | 55 |
| 234 | C top service corner | 56 |
| 236 | D top service corner | 57 |
| 238 | E bottom service corner | 54 |
| 240 | F bottom service corner | 55 |
| 242 | G bottom service corner | 56 |
| 244 | H bottom service corner | 57 |
| 246 | whole face | 69 |
| 248 | whole face | 69 |
| 250 | tiled face | 69 |
| 252 | tense field (example) | 2, 58 |

DESCRIPTION (FIG. 44 AND FIG. 45)

Classification of Verb-Related Grammar of English Language.

Grammar is a set of rules that describe an architecture of language. A proper representation of verb-related grammar requires proper classification of verbs. A table #1 shows such classification. In this table each verb-related grammar category has its column (e.g., Modals). Rows of the table show levels of organizational structure for each verb-related grammar category (e.g., L2). Rows also show component(s) that build this level (e.g., matrix, FIG. 25-30) and how this level relates to Grammar Unit structure (e.g. Assembly of reference tables).

Intersections of verb-related grammar category columns and level rows produce cells. Each cell contains a figure (e.g., FIG. 9) or a number of figures that describe this cell. Assembly of cells (e.g., L1+L2+L3) of each verb-related grammar category (e.g., Modals) builds a Grammar Unit (GU). Each GU is an item of a structured description of its verb-related grammar category. GU describes distinctive features of its verb-related grammar category by reference tables, grammar formulas, sample sentences, phrases etc.

TABLE #1

| Level | Component | Function & Composition | Verbs (VB) Finitives (AV/2B) | Verbals (VL) | | | | Modals (M) Modals |
|---|---|---|---|---|---|---|---|---|
| | | | | In-finitives (AV/2B) | Par 1 (AV/2B) | Ger (AV/2B) | Par 2 (AV/2B) | |
| L4 | Solid Body | Root node (for Grammar Units) | | | FIG. 41 | | | |
| L3 | Grammar chart | Grammar Unit (GU) | Assembly of matrices/ reference tables (GU highest level) | FIG. 2, 3, 15 | FIG. 4, 5, 16 | FIG. 6, 7, 17 | FIG. 6, 7, 17 | FIG. 37 |
| L2 | Matrix | | Assembly of reference tables | FIG. 9-14, 19-24 | | | | FIG. 25-30, 31-36 |
| L1 | Reference table | | Reference table. (GU lowest level) | FIG. 9 | FIG. 38 | 39 | 39 | FIG. 8, 18 | FIG. 25-30, 31-36 |
| Level | Component | Function & Composition | FIGS. | FIGS. | FIGS. | FIGS. | FIGS. | FIGS. |

Explanations to the table #1:

"Finitive" (plural form-"Finitives")—a term introduced as antonym to a term "Infinitive" (plural form-"Infinitives"). See Glossary for detailed explanation.

Grammar Unit (GU)—assembly of levels from L1 to L3 within one verb-related grammar category.

Root node—foundation for GUs, L4.

Par 1—Participles 1.

Ger—Gerunds.

Par 2—Participle 2.

AV—Action Verbs. All non-modal verbs and all verbals of English language except "to be"

2B—Verb of State. The verb "to be" and its verbals.

1. Finitives

Finitives are the most complex part of English language verbal grammar. This invention treats AV Finitives separately from 2B Finitives. Separation of "to be" from other verbs leads to advantages in English teaching and learning. For example, it becomes clear to students that "to be" does not have passive forms. Another advantage of separation is an opportunity to differentiate obsoleting tenses of "to be" from the ones in active use. Obsoleting tenses on FIG. 15 and FIG. 3 have dino shapes.

1.1 AV Finitives

Grammar Charts on FIG. 2 (Active) and FIG. 3 (Passive) show grammar tenses for AV Finitives. Each grammar tense (e.g., Present Indefinite tense on FIG. 2) has inside set of prescriptive rules for building sentences. A set of standard sentences for a given tense (e.g., Present Indefinite tense, Active voice) as on FIGS. 9-14 according to this invention is a "matrix of a given tense", or a "Matrix". Each individual table within a Matrix (e.g., FIG. 9) is a Reference Table (RD. It shows specific type of sentences usage. RT is the first and the lowest level (L1) of its Grammar Unit (GU). Matrix is the second level (L2) of the Grammar Unit (GU). Grammar Chart as on FIG. 2 is the third level (L3) of the Grammar Unit (GU).

Matrices of all AV Finitives both in Active and Passive voices follow AUX+model in all tenses.

TABLE #2

| AV Matrix/AUX+ | | | | | | | | | |
|---|---|---|---|---|---|---|---|---|---|
| Statements | | Questions (Q) | | | | | | | |
| | | QT1 | | | | | | | QT2 |
| (S) | | G? | | QW&G? | | S&DJ? | | | |
| + | − | + | − | + | − | + | − | + | − |
| FIG. 9 | | FIG. 10 | | FIG. 11, 12 | | FIG. 13 | | FIG. 14 | |

Explanation:

AV Matrix-a matrix for AV Finitives.

AUX+-a conjugation model with auxiliary verbs.

In this classification any sentence is either a Question (Q) or a Statement (S).

Any Statement or Question can be either positive (+) or negative (−).

Questions have two groups: Questions Type 1 (QT1) and Questions Type 2 (QT2).

Questions Type 1 (QT1) include following types of questions:

a) General question (G?), b) General question preceded by Question Word (QW&G?), c) Disjunctive question. A disjunctive question is a Statement(S) with a disjunctive question tag(DJ?). Abbreviation for this type of questions is S&DJ?.

General questions with Question Words (QW&G?) can have a reversed word order in negative sentence (QW&G?−)R, FIG. 12.

A term "Question Words" unifies individual Question Words (e.g., What, Where, When, How, Why) and Question Phrases (e.g., How many, How much, From where etc.).

Questions Type 2 (QT2) are questions to subject (Q2S).

1.2 2B Finitives

Grammar Chart on FIG. 15 (Active) shows grammar tenses for 2B Finitives. As with AV Finitives, each individual grammar tense of the verb "to be" (e.g., Present Indefinite tense) has inside set of prescriptive rules for building sentences, see FIGS. 19-24.

Verb "to be" is intransitive and doesn't have passive voice. Matrix of 2B Finitive follows mixed AUX model. In Future Indefinite, Future-in-the-Past Indefinite and all Perfect tenses it has auxiliary verbs (AUX+, as in table #2). In Past Indefinite, Present Indefinite, Past Continuous and Present Continuous tenses it does not have auxiliary verbs (AUX−, as in table #3).

TABLE #3

2B Matrix/AUX−

| Statements | Questions (Q) | | | | | | | |
|---|---|---|---|---|---|---|---|---|
| | QT1 | | | | | | QT2 | |
| (S) | G? | | QW&G? | | S&DJ? | | | |
| + − | + | − | + | − | + | − | + | − |
| FIG. 19 | FIG. 20 | | FIG. 21, 22 | | FIG. 23 | | FIG. 24 | |

Verb "to be" has 2 (two) roles: a) an independent verb, b) a service/auxiliary verb within tense form constructions. Being an independent verb, in Past Indefinite Active tense it has regular, as in table #4, and modified, as in table #5, conjugation forms. Modified form serves for subjunctive and conditional constructions (e.g., If I were you I would go there).

TABLE #4

REGULAR

| S+ | | | S− | | |
|---|---|---|---|---|---|
| I | was | in park | I | wasn't | in park |
| You | were | in park | You | weren't | in park |
| He | was | in park | He | wasn't | in park |
| She | was | in park | She | wasn't | in park |
| It | was | in park | It | wasn't | in park |
| We | were | in park | We | weren't | in park |
| You | were | in park | You | weren't | in park |
| They | were | in park | They | weren't | in park |

TABLE #5

MODIFIED

| S+ | | | S− | | |
|---|---|---|---|---|---|
| (If) I | were | in park | (If) I | weren't | in park |
| (If) You | were | in park | (If) You | weren't | in park |
| (If) He | were | in park | (If) He | weren't | in park |
| (If) She | were | in park | (If) She | weren't | in park |
| (If) It | were | in park | (If) It | weren't | in park |
| (If) We | were | in park | (If) We | weren't | in park |
| (If) You | were | in park | (If) You | weren't | in park |
| (If) They | were | in park | (If) They | weren't | in park |

2. Infinitives

Similar to Finitives, this invention treats AV Infinitives separately from 2B Infinitives. This separation leads to advantages in teaching and learning. Infinitives GU has only 2 (two) levels (L3 and L1) according to the table #1.

2.1 AV Infinitives

Grammar Charts (L3) of AV Infinitives are on FIG. 4 (Active) and FIG. 5 (Passive). There are 2 (two) types of infinitives in English language. One of them is zero (bare) infinitive. Zero (bare) infinitive is an infinitive without "to" in its form. The other one is to-infinitive. To-infinitive has "to" in its form. Both variants are present in FIG. 4 and FIG. 5 in negative and positive. Sample RT of AV Infinitives (L1) is on FIG. 38.

2.2 2B Infinitives

Grammar Chart (L3) of 2B Infinitives is on FIG. 16 (Active). There is no sample RT for 2B Infinitives because it is the same as RT of AV Infinitives.

3. Participles 1/Gerunds

In their grammatical sense Participles 1 and Gerunds are different entities. However, their forms are identical. According to classification provided in the table #1, GU of Participles 1 and Gerunds has 2 levels (L3 and L1).

3.1 AV Participles 1/Gerunds

Grammar Charts of AV Participles 1 and AV Gerunds are on FIG. 6 (Active) and FIG. 7 (Passive). Sample RT is on FIG. 39.

3.2 2B Participles 1/Gerunds

Grammar Charts of 2B Participles 1 and 2B Gerunds are on FIG. 17 (Active). There is no sample RT because it is the same as RT of AV Participles 1/Gerunds.

4. Participle 2

Participle 2 GU has 1 (one) level. Its RT represents a whole GU. There is no division into Active and Passive voices.

4.1 AV Participle 2

RT of AV Participle 2 serves at its Grammar Chart. It is on FIG. 8.

4.2 2B Participle 2

RT of 2B Participle 2 serves at its Grammar Chart. It is on FIG. 18.

5. Modals

Modals GU has 3 levels (L1-L3). There is no division into Active and Passive voices. Sample Grammar Chart (L3) of modal verbs is on FIG. 37. There is no need to put here all Grammar Charts for all modal verbs. It is a common knowledge for English language professionals and educated English speakers. Each tense (e.g. Present tense on FIG. 37) has its own Matrix (L2). The RTs (L1) as on FIGS. 25-30 show sample Matrix for Present Tense of the modal verb "can".

Modal verbs have two sub-categories:
- Full-modals—modal verbs that cannot function as Finitives (e.g., can, may, must)
- Semi-modals—modal verbs that can function both as modal verbs and as Finitives. (e.g., dare, need)

TABLE #6

| Modals | |
|---|---|
| Full (1) | Semi (½) |

Matrices of modal verbs represent a mixture of matrix models.
- Modal verbs like "can", "may", "must" follow AUX− model (auxiliary verbs are not used).
- Modal verbs like "to be able to", "used to" follow AUX+model (auxiliary verbs are used).
- Modal verbs like "have to", "had to" follow mixed model (AUX+/−)

TABLE #7

| Matrix (Modals)/AUX− | | | | | | | | | |
|---|---|---|---|---|---|---|---|---|---|
| Statements | | Questions (Q) | | | | | | | |
| | | QT1 | | | | | | | |
| (S) | | G? | | QW&G? | | S&DJ? | | QT2 | |
| + | − | + | − | + | − | + | − | + | − |
| FIG. 25 | | FIG. 26 | | FIG. 27, 28 | | FIG. 29 | | FIG. 30 | |

TABLE #8

| Matrix (Modals)/AUX+ | | | | | | | | | |
|---|---|---|---|---|---|---|---|---|---|
| Statements | | Questions (Q) | | | | | | | |
| | | QT1 | | | | | | | |
| (S) | | G? | | QW&G? | | S&DJ? | | QT2 | |
| + | − | + | − | + | − | + | − | + | − |
| FIG. 31 | | FIG. 32 | | FIG. 33, 34 | | FIG. 35 | | FIG. 36 | |

There is no need in detailed description of individual matrices for each modal verb. It is a common knowledge, familiar to language professionals and educated English speakers.

Imperatives

There are 3 (three) moods in English: 1) Indicative mood, 2) Subjunctive/Conditional mood and 3) Imperative mood. Grammar Units (GU) system articulates any standard verb-related grammar situation in Indicative and Subjunctive/Conditional moods. Imperative mood is an independent supplement to GU classification provided in a table #1. There are simple and complex constructions of Imperatives in English language.

Simple forms of imperative mood are "Do!" (+) and "Don't do!" (−)). There is also imperative form involving "let" (e.g., Let's go! (+)), Let's not go!(−)). Complex imperative constructions like "modal+infinitive" (e.g., You should go!) work as combinations of GUs.

Embodiment—Grammar Cube.

Tables and charts in a table #1 articulate standard verb-related grammar of English language. However, they are numerous. Learning them is a challenge for students of English language. There is a need in a teaching and learning aid that would put them in order and help to navigate among them. A concept of Grammar Organizer (GO) serves this purpose. One of possible (but not limited to) embodiments of GO is a cube. The cube is an organizational core and operational hub for tables and charts. It helps to articulate abstract logic of a language grammar by a natural logic of a geometric figure.

Each face of the cube serves to position one item of a structured description of a verb-related grammar (Grammar Unit). This way the cube organizes all verb-related language grammar into a 3D system. It allows easy navigation between different GUs. Inner structure of each Grammar Unit (GU) serves for navigation inside GU. The cube with GUs on its sides is a Grammar Cube (GC).

Grammar Cube has two kinds of surfaces: main surfaces and service surfaces. Main Surfaces (MS) bear GUs and perform educational function. Service Surfaces (SS) perform both educational and technical functions. A reference numeral 200 shows example of a MS on a FIG. 41. On the same FIG. 41, reference numerals 202 and 204 show examples of Service Surfaces. Each MS of the cube has its number (FIG. 40 and FIG. 41). They are #1-front, #2-left, #3-back, #4-right, #5-top, #6-bottom. Upper and lower parts of MSs #1, 2, 3, 4 bear upper and lower signs. A table #9 details which sign belongs to which MS. Abbreviations of FIG. 52 are Pa—past, Pr—present, Fu—future, FuiP—future-in-the-past, Ind—indefinite, Con—continuous, Per—perfect, P.Con—perfect continuous.

TABLE #9

| MS# | 1 | 2 | 3 | 4 |
|---|---|---|---|---|
| upper sign | FIG. 52 | FIG. 53 | FIG. 52 | FIG. 53 |
| lower sign | FIG. 49 | FIG. 50 | FIG. 51 | FIG. 50 |

Main Surfaces of the Grammar Cube have different assigned colors to convey grammar information. The colors are:

AV Finitives (yellow),
2B Finitives (pink),
AV Infinitives and 2B Infinitives (green),
AV Participles 1 and 2B Participles 1 (orange),
AV Gerunds and 2B Gerunds (brown),
AV Participle 2 and 2B Participle 2 (purple),
Modals 1 and Modals % (cyan).

Assigned color for Imperatives is red. Service Surfaces don't have assigned colors.

Grammar Charts of AV and 2B represent equally big parts of verb-related grammar. Each part needs a separate cube. However, having two cubes is not a practical solution. It's more convenient to use one cube but to separate AV and 2B into different modes and to switch between them according on end-user's needs.

In either AV or 2B mode, there are more GU tables to show than Main Surfaces on the cube to accommodate them. A solution is to sort them into permanent and on-demand layers for each mode. Following table details permanent and on-demand layers on the cube for AV mode:

TABLE #10

| Category | | Chart | MS#* | Layer** |
|---|---|---|---|---|
| ACT | Finitives | FIG. 2 | 1 | P |
| | Infinitives | FIG. 4 | 4 | P |
| | Gerunds/Participles I | FIG. 6 | 4 | OD |
| PASS | Finitives | FIG. 3 | 3 | P |
| | Infinitives | FIG. 5 | 2 | P |
| | Gerunds/Participles I | FIG. 7 | 2 | OD |
| | Participles II | FIG. 8 | 3 | OD |

*MS#—Main Surface number.
**Layer—some Grammar Charts stay on MS permanently. They are "permanent layers" (P). Some Grammar Charts appear on MS temporary on-demand. They are "on-demand layers" (OD).
ACT—Active voice
PASS—Passive voice Following table details permanent and on-demand layers on the cube for 2B mode:

TABLE #11

| Category | | Charts | MS# | Layer |
|---|---|---|---|---|
| ACT | Finitives | FIG. 15 | 1 | P |
| | Infinitives | FIG. 16 | 4 | P |
| | Gerunds/Participles I | FIG. 17 | 4 | OD |

TABLE #11-continued

| Category | | Charts | MS# | Layer |
|---|---|---|---|---|
| PASS | | | | |
| | Participles II | FIG. 18 | 3 | OD |

Modal verbs stay on MS #5. Design of MS #5 makes both groups of Modals visible but impossible to study at the same time (FIG. 42-43). End-user has to turn up either «1 modals» corner, or «½ modals» corner. It helps to memorize them together but as different entities. Imperatives stay on MS #6 (FIG. 45).

There are two kinds of Service Surfaces (SS) of the Grammar Cube: a) Service Bars (SB) 202 and b) Service Corners (SC) 204. Drawings on FIGS. 54, 55, 56, 57 show basic shapes of the Grammar Cube with reference numerals. Reference numerals detailed in Tables #12 and #13 index Service Surfaces and explain their positions and roles on the cube.

TABLE #12

| | Service Bars (SB) | | |
|---|---|---|---|
| | Top (T) | Bottom (B) | Vertical (V) |
| 1 | Active voice, (FIG. 47) - 206, (FIG. 54) | empty spacer - 214, (FIG. 54) | empty spacer - 222, (FIG. 54) |
| 2 | Passive voice, (FIG. 48) - 208, (FIG. 54) | empty spacer - 216, (FIG. 54) | aspect sign - 224, (FIG. 55) |
| 3 | Passive voice, (FIG. 48) - 210, (FIG. 55) | empty spacer - 218, (FIG. 55) | empty spacer - 226, (FIG. 56) |
| 4 | Active voice, (FIG. 47) - 212, (FIG. 56) | empty spacer - 220, (FIG. 56) | aspect sign - 228, (FIG. 57) |

TABLE #13

| Service Corners (SC) | |
|---|---|
| top | bottom |
| (A) empty spacer - 230, (FIG. 54) | (E) empty spacer - 238, (FIG. 54) |
| (B) empty spacer - 232, (FIG. 55) | (F) empty spacer - 240, (FIG. 55) |
| (C) empty spacer - 234, (FIG. 56) | (G) empty spacer - 242, (FIG. 56) |
| (D) empty spacer - 236, (FIG. 57) | (H) empty spacer - 244, (FIG. 57) |

Service Bars at the bottom and all Service Corners are left empty with a purpose. Leaving them empty gives room for technical/engineering functionality that may appear necessary (e.g. switched, sockets etc.). There is no sense to describe here technical functionality in its full variety. It doesn't relate directly to the Grammar Cube educational functionality and is a common knowledge for industrial engineers and designers skilled in the art.

Each Main Surface (MS) is either a whole piece 246 or assembly of individual tiles 250. Individual tiles stay on movable blocks. Blocks move forward, backward and tilt their face against their surface of the cube (FIGS. 70, 71, 72). Tiled faces convey grammar information by changing their shape. There are various software and hardware solutions exist to achieve this result. There is no need to give detailed technical descriptions for these solutions because it is a common knowledge for professionals skilled in the art.

Default configuration Grammar Cube has a following view:
a) Active Finitives, Active Infinitives and Modals—FIG. 44
b) Passive Finitives, Passive Infinitives and Imperatives—FIG. 45

Operation (FIGS. 58-61, 63-66, 70-74)

Grammar Cube operates in 3 (three) types of environments, each one having its advantages:

1. Physical Reality (PhR)
   In PhR Grammar Cube works as a hardware system. With hardware Grammar Cube students literally have first-hand/tactile experience of English grammar.
2. Virtual Reality (VR)
   In VR Grammar Cube works as a software. Its advantage is an opportunity of quick implementation across various operation systems. It is also an affordable solution with global reach.
3. Augmented Reality (AR) AR allows combination of VR and PhR benefits.

1. PhR Version.

Operation of a hardware version of Grammar Cube is similar to operation of a smartphone. Each face of the cube works as a smartphone screen. It responds to standard interface gestures (e.g., tap, double-tap, swipe etc.). In its hardware (PhR) version, Grammar Cube works as a stand-alone product and together with other device(s) (e.g., computer, smartphone, tablet PC, smart whiteboard etc.).

Examples of Hardware Grammar Cube Usage:

a) Educational Tool for Studying Verbal Forms and Tenses.

In its default configuration Grammar Cube shows reference grammar materials on its sides. Teachers and students use them for teaching/learning English grammar. For example, each grammar tense field (e.g., tense field 252 of Active tenses chart FIG. 2, MS #1) shows its formula. Each tense field is also a tap field. One-time tap on the tense field (FIG. 58) expands it into a new dialogue window, providing end-user with next step of choice (FIG. 59) until a Reference Table opens (FIG. 60). Sample algorithm of dialogue windows behavior for AV Present Indefinite Active tense is on FIG. 62. Abbreviations on FIG. 62 are S—sentence, Q—question, Q2O—question to object, Q2S—question to subject, G—general question, QW&G—general question preceded by a question word, DJ—disjunctive question. Other abbreviations in the Reference Tables were explained before. There is no need to give detailed algorithms for each tense. They follow the same logic of a sample algorithm on FIG. 62. Double-tap closes dialogue window at any step.

Figure 66:
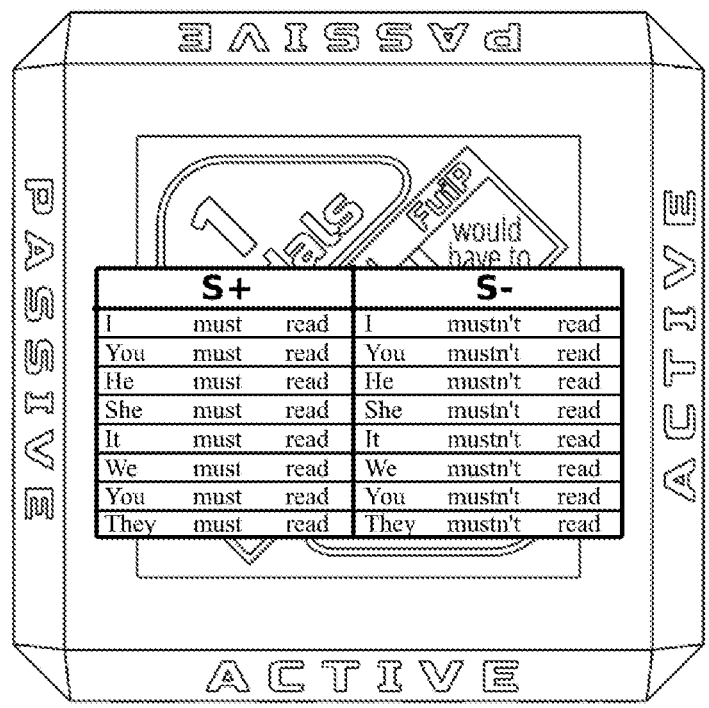

Tapping on "Modals 1" field (FIG. 63) shows Pa, Pr, Fu and FuiP forms of one full modal verb. Further tapping on "Modals 1" field scrolls related list of modal verbs and their forms. There is no need to give list of modal verbs here. It is a common knowledge for English language professionals and educated speakers. Once modal verb is found, end-user taps tense field of this verb (FIG. 64) to go through dialogue window(s) (FIG. 65) to a target Reference Table (FIG. 66). Double-tap closes dialogue window at any step. To see Reference Tables of semi-modal verbs end-user taps on "Modals ½" field and does the same steps as described for "Modal 1".

Swiping finger up on MSs #2, 3, 4 (FIG. 61) brings on-demand (OD) layers. Double-tap takes OD layer down. Tables #10 and #11 detail OD layers and their functions.

b) Educational Tool for Positions of Tenses on a Timeline (TimeStairs Function).

Different tenses in English language have different positions on a timeline (FIG. 68). It takes extra effort for a teacher to explain that Past Perfect is "deeper" in time than Present Indefinite. Another difficulty is explanation of Present Perfect tense. It is often mixed with Past Indefinite tense. Students don't understand why Present Perfect is called "present" when it denotes past event(s).

To address this issue, Grammar Cube has a dedicated function. It is a TimeStairs function (TS). When end-user activates this function, faces of the Grammar Cube produce changing of their shape. Changing of shape conveys grammar information about position of different tenses on a timeline. There is a number of ways to activate/deactivate this function and produce mechanical change of a shape. There is no need to give full description of all engineering solutions. It is a common knowledge for skilled in the art mechanical engineers.

The following transformations happen after activation of this function:

on a MS #1 (AV, active voice), see FIG. 70:
- all Future-in-the-Past tenses, Present Indefinite and Present Continuous tenses remain on their places.
- all Future tenses go forward.
- Past Indefinite and Past Continuous go back.
- Past Perfect and Past Perfect Continuous go back deeper than Past Indefinite and Past Continuous. This way they show that they are the deepest tenses on a time-line.
- Present Perfect and Present Perfect Continuous tilt and form a slope. This way they show that from one side they relate to present but from another side they have connection with past.

on MS #3 (AV, passive voice), see FIG. 71:
- obsolete tenses (all Perfect Continuous tenses, Future Continuous and Future-in-the-Past Continuous) are inactive.
- Future-in-the-Past Indefinite, Future-in-the-Past Perfect tenses remain on their places.
- Future Indefinite and Future Perfect move forward.
- Present Perfect tilts and forms a slope.
- Past Indefinite and Past Continuous go back.
- Past Perfect goes back deeper than Past Indefinite and Past Continuous.

In 2B mode:

on MS #1 (2B, active voice), see FIG. 72:
- obsoleting tenses of the verb "to be" (all Perfect Continuous tenses, Future Continuous and Future-in-the-Past Continuous) are inactive.
- Present Indefinite, Present Continuous, Future-in-the-Past Indefinite and Future-in-the-Past Perfect tenses remain on their places.
- Future Indefinite and Future Perfect move forward.
- Present Perfect tilts and forms a slope.
- Past Indefinite and Past Continuous go back.
- Past Perfect goes back deeper than Past Indefinite and Past Continuous to show that it is the deepest tense on a time-line.
- verb "to be" doesn't have passive voice. Because of that, MS #3 in 2B mode remains inactive and empty, see FIG. 73.

c) A 3D Projector of a Verb-Related Grammar in a Sentence (ColorDance Function).

Recognition of verbal forms and tense structures in sentences is one of the goals of grammar studies. ColorDance function addresses this issue. Grammar Cube works as a colored grammar display in 3D. For example, a sentence "I could have told them but I didn't." displays on the sides of Grammar Cube as (see FIG. 74): "I could [MS #5, Past field of "can"-CYAN] have told [MS #4, AV mode, Perfect Infinitive field—GREEN] them but I didn't [MS #1, AV mode, Past Indefinite field—YELLOW]". Verbal parts of a sentence bear colors of related sides of the cube: "I could [CYAN] have told [GREEN] them but I didn't [YELLOW]". ColorDance function makes grammar visible for students.

2. VR Version.

In VR version Grammar Cube is a software model that performs the same functions as a hardware model. Software model runs on computers, tablet PCs, smartphones, game consoles, smart watches, hologram projectors, interactive boards, VR headgear and other computing devices. End-user interacts with Grammar Cube through keyboard, mouse, joystick, touch-pad, touch-screen, digitizer-pad, motion sensing, wired glove(s), voice commands and any other input interface.

Extra Functions:
a) Educational course navigation tool. It helps to see a general level of student's progress. A sample design of such educational course interface is on FIG. 75. The cube is in upper left corner. At the beginning of a course all parts of the cube are inactive and gray. Following student's progress, individual parts of the cube become active and colored. They show how much grammar student already knows. Comparing inactive (gray) and activated (colored) parts of the cube, a student tracks current level of progress.
b) A feature of word-processing software. Having Grammar Cube as a part of a word-processing tools allows 3D analysis of verb-related forms and tenses in a text as on FIG. 76.

3. AR Version

Augmented reality (AR) version combines functionality of PhR and VR. AR version runs on any device that supports AR technology (smartphone, tablet PC, Google Glass, Microsoft Hololens, AR contact lenses, Virtual Retinal Display etc.). Using AR allows building more simple hardware Grammar Cube to offer it at a lower price. It is cheaper to simulate complex transformations feature like TimeStairs in AR, than to build it in hardware. End-user holds hardware cube model in hands and interacts with AR menus and functions (FIG. 77).

CONCLUSIONS, RAMIFICATIONS AND SCOPE

From provided description a reader will see that usage of Grammar Cube makes grammar teaching, learning, presentation, navigation and analysis efficient. Complicated and obscure grammar theory becomes visible, clear and alive. Students naturally engage in educational process. They build better grammar skills with less time and effort. Grammar Cube focuses students' attention to the core of a grammar course. A teacher shows more and talks less. It decreases teacher's burden in class, saves lesson time and makes teaching more productive.

While descriptions given above contain many details, these should not be construed as limitations on the scope, but rather as an exemplification of embodiment(s) thereof. Other ramifications are possible. Languages with grammar structure different from English can employ different figures for organization. Other multi-faceted solids can serve as a basement for grammar arrangement.

Principle of a language grammar organization by usage of a multi-faceted solid has numerous applications in grammar theory and practice. It builds a foundation of a new branch of linguistic science—"Polytopial grammar" or "Polyhedral grammar". Choice of figures (solids) for each case in each language depends on grammar complexity, end-users convenience, authors choice and other reasons that influence final result. Accordingly, the scope should be determined not by the embodiment(s) illustrated, but by the appended claims and their legal equivalents.

GLOSSARY

Finitive (plural form—"Finitives")—a term introduced in this invention to denote grammatical tense as "time+ aspect" (e.g., present continuous, past perfect). Introduction of a special term became necessary to avoid misunderstanding between "tense" as "time" (e.g., present, past, future) and "tense" as "time+aspect" (e.g., present continuous, past perfect). Finitive is an antonym to a term "Infinitive".

reference table (RD—a table showing prescriptive rules for specific type of sentences (e.g., FIG. 9). The lowest level (L1) in a Grammar Unit (see table #1).

matrix—a structured assembly of reference tables. It shows a standard set of prescriptive rules for building sentences within a given verb-related grammar category (e.g., FIG. 9-14). Level 2 (L2) in a grammar unit (see table #1).

grammar chart—a structured assembly of matrices (e.g., FIG. 2). Level 3 (L3) in grammar unit (see table #1).

grammar unit (GU)—an item of a structured description for a given verb-related grammar category. Assembly of levels from L1 to L3 within one verb-related grammar category in the table #1 (e.g., AV Finitives GU, L1+L2+L3). It describes distinctive features of its verb-related grammar category by reference tables, grammar formulas, sample sentences etc.

Grammar Cube—a solid body with grammar units on its faces. Top level (L4) in a structural arrangement (see table #1).

grammar category/category of words—part of speech (e.g., verb, noun, adjective etc.).

category of verb-related grammar/verb-related grammar category—sub-division of verbs and verbals by category (e.g., infinitives, modal verbs, participles, etc.).

Action Verbs (AV)—in this invention means all non-modal verbs and all verbals of English language except the verb "to be". Abbreviation for Action Verbs is AV.

Verb of State (2B)—in this invention verb of state means the verb "to be" and its verbals.

Abbreviation for the verb "to be" is 2B.

field—any cell of any grammar chart on Grammar Cube.

tense field—a cell of Active/Passive Grammar Chart.

layer—information shown on Grammar Cube face(s).

AUX+—denotes a conjugation model with auxiliary verbs (e.g., They don't read).

AUX-—denotes a conjugation model without auxiliary verbs (e.g., She mustn't read).

Questions Type 1 (QT1)—questions to object.

Questions Type 2 (QT2, Q2S)—questions to subject.

G?—a general question.

QW&G?—a general question preceded by question word(s)

S&DJ?—a disjunctive question.

0+—zero (bare) form of Infinitive/Gerund/Participle 1, positive.

0-—zero (bare) form of Infinitive/Gerund/Participle 1, negative.

1+—"to" form of Infinitive/Gerund/Participle 1, positive.

1-—"to" form of Infinitive/Gerund/Participle 1, negative.

AV layers set/AV mode—combination of layers describing Action Verbs (AV).

2B layers set/2B mode—combination of layers describing the verb "to be" (2B).

permanent layer—layer that constantly stays on a Grammar Cube.

on-demand layer—layer that temporary appears above a permanent layer.

cube surface/main surface—face of a side of Grammar Cube.

service surface/minor surface—face on edge or vertex of Grammar Cube.

service bar—edge surface of Grammar Cube.

service corner—vertex surface of Grammar Cube.

TimeStairs function (TS)—transformations of Grammar Cube, showing positions of tenses on a time-line.

Sequence of Tenses function (SoT)—a visual depiction of grammar rules of sequence of tenses.

ColorDance function—function for projection of a verb-related grammar of a sentence on related parts of Grammar Cube and Grammar Navigator.

Grammar Player—a grammar playback function.

whole face—a Grammar Cube face that acts as one piece.

tiled face—a Grammar Cube face that acts as assembly of pieces (tiles).

tile—smallest unit of a tiled face.

verbal form—non-tense form of a verb (e.g., indefinite, gerund, participle %).

tense/tense form—tense related form of a verb.

verbal structure/construction—combination of verbal categories/tenses/forms in a sentence.

I claim:

1. A system for articulation of a verb-related language grammar, comprising:
   a. a cubical body which includes
      a plurality of faces;
         wherein each face includes a display means configured to display a plurality of structured description of verb-related language grammar;
         each face includes an area displaying verb-related language grammar configured to response to gestures, wherein said structured description on the area can be manipulated through said gestures;
         wherein each face is configured to display an assigned color to code its verb-related grammar category;
      a built-in microphone configured to recognize voice commands;
      the cubical body further includes speech processing features;
      a grammar player which includes player controls for manipulating the playback of the audio of the structured descriptions;
      the grammar player includes multiple operating modes: an assignment mode and a demonstration mode;
   b. said structured description of said verb-related language grammar includes a plurality of fields which comprises: reference tables, grammar formulas and sample sentences; a student is prompted to select one or more said fields to create a sentence or a phrase;
   c. a teacher tool which allows teachers to customize said structured description of said verb-related language grammar according to the needs of the student; said teacher tool includes:
      a word-processing software interface with said cubical body; wherein said reference tables, grammar formulas and sample sentences are customizable utilizing the word-processing software; and an interactive board remotely communicate with the cubical body;

d. a feedback module for providing one or more visual feedback based on the sentence or the phrase created by the student with said cubical body; and e. an educational course navigation tool for tracking a student's level of progress by enabling individual parts of the cube become active and colored.

2. The system for articulation of a verb-related language grammar of claim 1, wherein the gestures include tap, double-tap, swipe and click.

3. The system for articulation of a verb-related language grammar of claim 1, wherein the player controls includes play, block-by-block play, stop, pause and playback speed slider.

4. The system for articulation of a verb-related language grammar of claim 1, wherein the speech processing features includes a speech to text feature and a text to speech feature.

5. The system for articulation of a verb-related language grammar of claim 1, wherein said displaying means include interactive boards and displays, Augmented Reality (AR)/Virtual Reality (VR) helmets and goggles, holographic and retinal displays.

6. The system for articulation of a verb-related language grammar of claim 1, wherein cubical body includes two type of surfaces: main surface (MS) and service surface (SS); wherein MS shows Grammar Units (GUs) for performing educational function and SS performs both educational and technical functions.

\* \* \* \* \*